US011893046B2

(12) United States Patent
Mack

(10) Patent No.: US 11,893,046 B2
(45) Date of Patent: **\*Feb. 6, 2024**

(54) METHOD AND APPARATUS FOR IMPLEMENTING A SET OF INTEGRATED DATA SYSTEMS

(71) Applicant: Robert Mack, Hillsborough, NJ (US)

(72) Inventor: Robert Mack, Hillsborough, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/724,924

(22) Filed: Apr. 20, 2022

(65) Prior Publication Data
US 2022/0245177 A1 Aug. 4, 2022

Related U.S. Application Data

(63) Continuation of application No. 16/531,652, filed on Aug. 5, 2019, now Pat. No. 11,341,171, which is a
(Continued)

(51) Int. Cl.
*G06F 16/00* (2019.01)
*G06F 16/28* (2019.01)
(Continued)

(52) U.S. Cl.
CPC .......... *G06F 16/288* (2019.01); *G06F 16/212* (2019.01); *G06F 16/22* (2019.01);
(Continued)

(58) Field of Classification Search
CPC ........ G06F 16/288; G06F 16/27; G06F 16/22; G06F 16/38; G06F 16/2228;
(Continued)

(56) References Cited

U.S. PATENT DOCUMENTS 5,535,325 A 7/1996 Cattell
5,560,006 A 9/1996 Layden
(Continued)

FOREIGN PATENT DOCUMENTS

EP 0 589 070 A1 9/1992
WO WO 01/03008 A1 1/2001
(Continued)

OTHER PUBLICATIONS

C. Marinescu, "Identification of Relational Discrepancies between Database Schemas and Source-Code in Enterprise Applications", Ninth International Symposium on Symbolic and Numeric Algorithms for Scientific Computing (SYNASC 2007) (pp. 93-100).*
(Continued)

*Primary Examiner* — Srirama Channavajjala
(74) *Attorney, Agent, or Firm* — Walter J. Tencza, Jr.

(57) ABSTRACT

A method, an apparatus, and a system for configuring, designing, and/or implementing integrated data modeling methods for configuring direct data system interoperability between multiple data systems based upon compliance with data integration standards. Integrated data modeling is an enhancement of traditional data modeling where newly defined common entity relationships are used to join multiple data models. When instantiated, integrated data models form integrated data systems where data integrity is enforced among multiple data systems.

19 Claims, 14 Drawing Sheets

Related U.S. Application Data continuation of application No. 14/496,342, filed on Sep. 25, 2014, now Pat. No. 10,417,263, which is a continuation-in-part of application No. 13/746,083, filed on Jan. 21, 2013, now Pat. No. 8,874,619, which is a continuation-in-part of application No. 13/152,683, filed on Jun. 3, 2011, now Pat. No. 8,554,801.

(51) Int. Cl.
| | | |
|---|---|---|
| G06F 16/23 | (2019.01) | |
| G06F 16/22 | (2019.01) | |
| G06F 16/38 | (2019.01) | |
| G06F 16/21 | (2019.01) | |
| G06F 16/25 | (2019.01) | |
| G06F 16/27 | (2019.01) | |

(52) U.S. Cl.
CPC ...... *G06F 16/2228* (2019.01); *G06F 16/2365* (2019.01); *G06F 16/256* (2019.01); *G06F 16/27* (2019.01); *G06F 16/38* (2019.01)

(58) Field of Classification Search
CPC .. G06F 16/256; G06F 16/284; G06F 16/2456; G06F 16/217; G06F 16/214; G06F 16/254; G06F 16/25
See application file for complete search history.

(56) References Cited

U.S. PATENT DOCUMENTS

| | | | |
|---|---|---|---|
| 5,692,106 A | 11/1997 | Towers | |
| 5,701,453 A * | 12/1997 | Maloney | G06F 16/217 707/999.102 |
| 5,829,003 A | 10/1998 | Okura | |
| 5,907,846 A | 5/1999 | Berner et al. | |
| 5,966,712 A | 10/1999 | Sabatini | |
| 6,035,300 A | 3/2000 | Cason | |
| 6,212,530 B1 | 4/2001 | Kadlec | |
| 6,246,975 B1 | 6/2001 | Rivonelli | |
| 6,438,591 B1 | 8/2002 | Fehskens et al. | |
| 6,442,557 B1 | 8/2002 | Buteau | |
| 6,453,325 B1 | 9/2002 | Cabrera et al. | |
| 6,678,693 B1 | 1/2004 | Shirasihi | |
| 6,836,777 B2 | 12/2004 | Holle | |
| 6,847,979 B2 | 1/2005 | Allemang et al. | |
| 7,024,414 B2 | 4/2006 | Sah et al. | |
| 7,024,417 B1 | 4/2006 | Russakovsky et al. | |
| 7,167,873 B2 * | 1/2007 | Brobst | G06F 16/252 707/999.102 |
| 7,376,658 B1 | 5/2008 | Bumgarner et al. | |
| 7,401,094 B1 | 7/2008 | Kesler | |
| 7,512,633 B2 * | 3/2009 | Cohen | G06F 16/86 707/999.102 |
| 7,558,790 B1 | 7/2009 | Miller | |
| 7,603,378 B2 | 10/2009 | Ivanova | |
| 7,617,136 B1 | 11/2009 | Lessing et al. | |
| 7,620,665 B1 * | 11/2009 | George | G06F 16/214 |
| 7,676,493 B2 | 3/2010 | Pizzo et al. | |
| 7,693,862 B2 | 4/2010 | Chau et al. | |
| 7,945,604 B2 * | 5/2011 | Wang | G06F 16/284 707/960 |
| 7,979,475 B2 | 7/2011 | Mack | |
| 8,103,704 B2 * | 1/2012 | Abrams | G06F 16/258 707/811 |
| 8,150,886 B2 | 4/2012 | Rhodes | |
| 8,214,797 B2 * | 7/2012 | Cote | G06F 8/34 717/121 |
| 8,356,029 B2 | 1/2013 | Djugash et al. | |
| 8,468,170 B2 | 6/2013 | Bybee et al. | |
| 8,554,801 B2 | 10/2013 | Mack | |
| 8,713,434 B2 * | 4/2014 | Ford | G06F 16/288 707/758 |
| 8,739,118 B2 * | 5/2014 | Meek | G06F 16/25 717/104 |
| 8,812,553 B2 | 8/2014 | Trog et al. | |
| 8,874,619 B2 | 10/2014 | Mack | |
| 2002/0103793 A1 | 8/2002 | Koller et al. | |
| 2003/0046272 A1 | 3/2003 | Scanzano | |
| 2003/0055822 A1 | 3/2003 | Yu | |
| 2003/0149934 A1 | 8/2003 | Worden | |
| 2004/0015488 A1 * | 1/2004 | Anonsen | G06F 16/284 |
| 2005/0004902 A1 | 1/2005 | Torigoe et al. | |
| 2005/0091233 A1 | 4/2005 | Friske | |
| 2005/0240621 A1 | 10/2005 | Robertson et al. | |
| 2006/0173873 A1 | 8/2006 | Prompt et al. | |
| 2006/0179055 A1 | 8/2006 | Grinsfelder et al. | |
| 2006/0195460 A1 | 8/2006 | Nori | |
| 2007/0112834 A1 * | 5/2007 | Farr | G06F 16/2456 707/999.102 |
| 2007/0156767 A1 | 7/2007 | Hoang et al. | |
| 2007/0174317 A1 | 7/2007 | Bangel | |
| 2007/0255730 A1 | 11/2007 | Mack | |
| 2008/0201338 A1 | 8/2008 | Castro | |
| 2009/0063545 A1 | 3/2009 | Hsu | |
| 2009/0144319 A1 | 6/2009 | Panwar | |
| 2009/0172035 A1 | 7/2009 | Lessing | |
| 2009/0240714 A1 | 9/2009 | Keith et al. | |
| 2009/0287737 A1 | 11/2009 | Hammerly | |
| 2009/0327225 A1 | 12/2009 | Parra | |
| 2010/0287208 A1 | 11/2010 | Mao | |
| 2010/0299372 A1 | 11/2010 | Djugash et al. | |
| 2012/0084325 A1 | 4/2012 | Bansode et al. | |
| 2012/0089934 A1 | 4/2012 | Senjalia | |
| 2012/0102067 A1 * | 4/2012 | Cahill | G06F 16/27 707/E17.014 |
| 2013/0159280 A1 | 6/2013 | Soshin | |
| 2017/0169090 A1 | 6/2017 | Jose et al. | |

FOREIGN PATENT DOCUMENTS

| | | |
|---|---|---|
| WO | WO 03/003245 | 1/2003 |
| WO | WO2003021483 A2 * | 3/2003 |
| WO | WO 2007/001599 A2 | 1/2007 |
| WO | WO2009086311 A1 * | 7/2009 |
| WO | WO 2009/120172 A1 | 10/2009 |
| WO | WO 2015/181735 A1 | 12/2015 |
| WO | WO2016048614 A1 * | 3/2016 |

OTHER PUBLICATIONS

Tongrak, P et al., "A tool for generating test case from relational database constraints testing", 2009 2nd IEEE International Conference on Computer Science and Information Technology , Aug. 2009, (pp. 435-439).*

C. Marinescu, "Discovering the Objectual Meaning of Foreign Key Constraints in Enterprise Applications", 14th Working Conference on Reverse Engineering (WCRE 2007), Oct. 2007.* http://www.datamodel.org/NormalizationRules.html, Mar. 4, 2009.

Dey, Debabrata, et al., "Improving database Design through the Analysis of Relationships", ACM Transactions on Database Systems, vol. 24, No. 4, Dec. 1999, pp. 453-486.

Chan, Hock Chuan, et al., "An object-oriented implementation of an entity relationship model", The Journal of Systems and Software, vol. 41, Elsevier Science, Inc. @ 1998, pp.

Abadi, Daniel J., et al., "Column-Stores vs. Row-Stores: How Different Are They Really?", SIGMOD '08, Vancouver, BC, Canada, Jun. 9-12, 2008, pp. 967-980.

Dewson, Robin, Beginning SQL Server 2008 for Developers: From Novice to Professional, "Chapter 3: Database Design and Creation", Apress, Berkeley, CA @ 2008, pp. 51-89.

"Interrogative Theory of Information and Knowledge" Edward J. Quigley and Anthony Debons, SIGCPR '99 New Orleans LA, USA, Copyright ACM 1999.

"Visual Paradigm", Relational Database Design with ERD, Jul. 15, 2011.

* cited by examiner

| AX_ID(PK) | AX_Code(AK1) | AX_Name(AK2.1) | AX_Date(AK2.2) | AX_Description |
|---|---|---|---|---|
| 111 | ABC | ABC XXY | 3/2/2014 | ABC Desc. |
| 112 | ABD | ABC XXY | 3/11/2014 | ABC Desc.; New Code |
| 113 | AAA | AAA DDD | 3/11/2014 | AAA Description |
| 114 | ADD | ADD BBB | 3/11/2014 | Description ADD |
| 115 | BBD | BBD V1 | 3/11/2014 | Description of BBD |

1202

Z.AX

| AX_ID(PK) | AX_Code(AK1) | AX_Name(AK2.1) | AX_Date(AK2.2) | AX_Description |
|---|---|---|---|---|
| 111 | ABC | ABC XXY | 3/2/2014 | ABC Desc. |
| 114 | ADD | ADD BBB | 3/11/2014 | Description ADD |
| 121 | XYZ | XYZ ABC | 3/11/2014 | XYZ Desc. |
| 122 | XYY | XYY XZZ | 3/11/2014 | Description of XYY |
| 123 | MTM | MTM AAA | 3/11/2014 | MTM Description |

1203

YZ.AX

| AX_ID(PK) | AX_Code(AK1) | AX_Name(AK2.1) | AX_Date(AK2.2) | AX_Description |
|---|---|---|---|---|
| 111 | ABC | ABC XXY | 3/2/2014 | ABC Desc. |
| 112 | ABD | ABC XXY | 3/11/2014 | ABC Desc.; New Code |
| 113 | AAA | AAA DDD | 3/11/2014 | AAA Description |
| 114 | ADD | ADD BBB | 3/11/2014 | Description ADD |
| 115 | BBD | BBD V1 | 3/11/2014 | Description of BBD |
| 121 | XYZ | XYZ ABC | 3/11/2014 | XYZ Desc. |
| 122 | XYY | XYY XZZ | 3/11/2014 | Description of XYY |
| 123 | MTM | MTM AAA | 3/11/2014 | MTM Description |

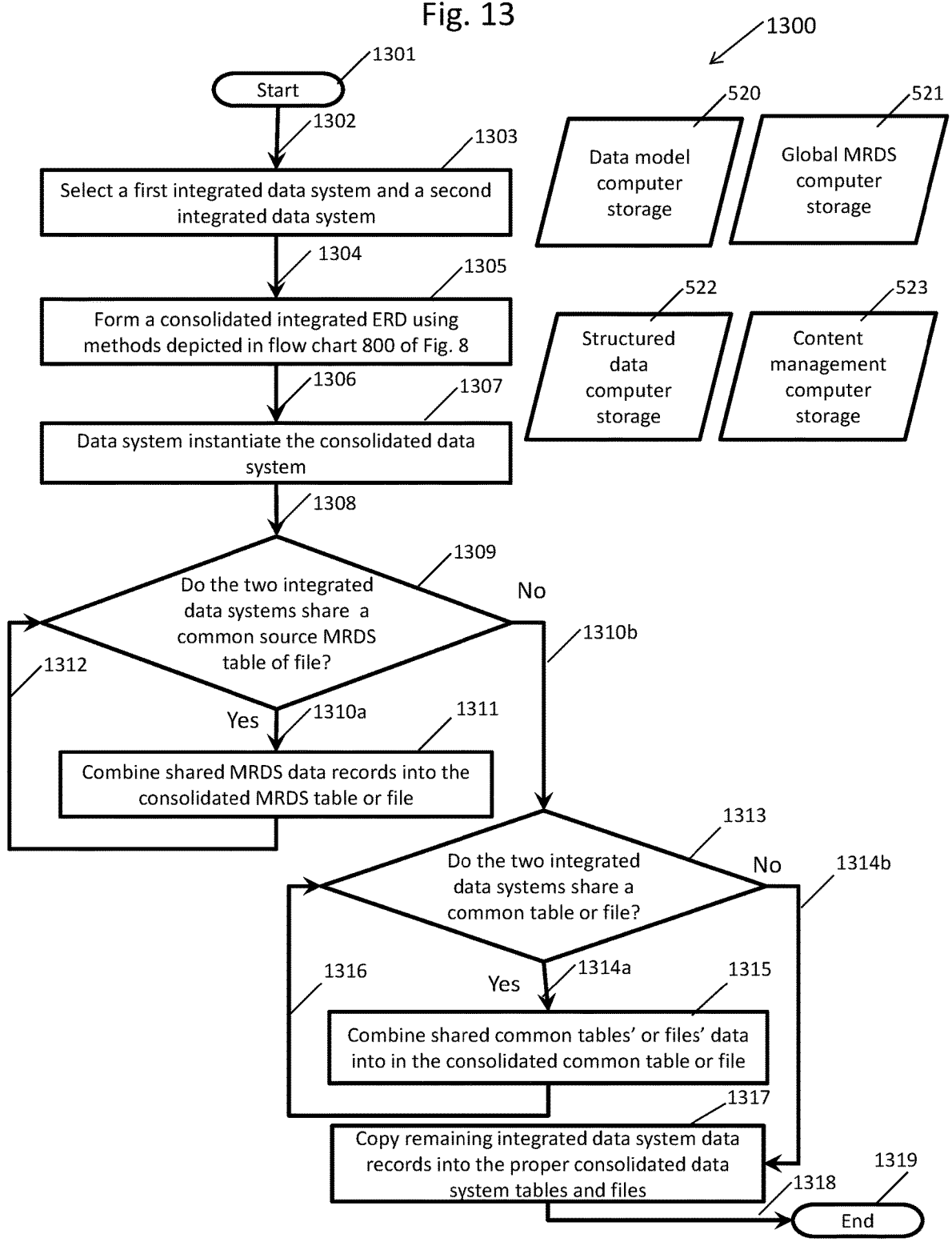

METHOD AND APPARATUS FOR IMPLEMENTING A SET OF INTEGRATED DATA SYSTEMS

CROSS REFERENCE TO RELATED APPLICATION(S)

The present application is a continuation of and claims the priority of U.S. patent application Ser. No. 16/531,652, filed on Aug. 5, 2019, titled "A METHOD AND APPARATUS FOR IMPLEMENTING A SET OF INTEGRATED DATA SYSTEMS", which is a continuation of and claims the priority of U.S. patent application Ser. No. 14/496,342, filed on Sep. 25, 2014, titled "A METHOD AND APPARATUS FOR IMPLEMENTING A SET OF INTEGRATED DATA SYSTEMS" inventor and applicant Robert Mack, which is a continuation in part of and claims the priority of U.S. patent application Ser. No. 13/746,083, filed on Jan. 21, 2013, titled "A METHOD AND APPARATUS FOR DEFINING COMMON ENTITY RELATIONSHIPS", inventor and applicant Robert Mack, which is a continuation in part of U.S. patent application Ser. No. 13/152,683 , filed on Jun. 3, 2011 titled "METHOD AND APPARATUS FOR CONVERTING HETEROGENEOUS DATABASES INTO STANDARDIZED HOMOGENEOUS DATABASES", inventor and applicant Robert Mack, such that Jun. 3, 2011 is the earliest priority date for the present application.

FIELD OF THE INVENTION

This invention relates to new methods and apparatus concerning the design, development, implementation, and maintenance of integrated data systems.

BACKGROUND OF THE INVENTION

In 1976, the concept of entity-relationship diagramming and data modeling was developed. When data integration became important in the late 1980's, the databases designed and/or configured with prior art data modeling methods became characterized as disparate islands of data or as incompatible information silos. The reason these databases were characterized as information silos was because of data structure incompatibility and data set incompatibility between databases designed and/or configured using the established data modeling methods. Simply stated, prior art data modeling methods were engineered to configure a single database and not engineered to configure a set of compatible databases.

Enterprise data models have been designed and/or configured using established data modeling methods. Enterprise data models usually represent multiple databases for an organization where the enterprise data model becomes a foundation for structural metadata commonality among the set of multiple databases represented. Unfortunately, structural metadata commonality does not address all the parameters needed to establish data integration across databases and therefore, enterprise data models offered little improvement in instantiating a set of integrated databases. Since prior art data models do not address the factors needed to support data system integration, incompatible databases that are often characterized as information silos, are always data system instantiated when using prior art data modeling methods.

Commonly used data modeling methods were engineered to configure only databases. However, our data universe is comprised of non-database types of data content, such as documents, web pages, spreadsheets, and videos for example. Content management systems are sometimes used to manage non-database types of data content data files. Enhanced data modeling methods will be used to allow for the modeling of all data content types that may be stored in the computer memory.

There are two main methods of prior art data integration which we refer to as transformative data consolidation and data federation of incompatible data systems. Transformative data consolidation methods involve extracting data values from multiple source data systems and transforming those source data values into a form compatible with a target consolidated database into which the transformed data is then loaded. This method is also known as Extract, Transform, and Load (ELT). Data federation methods attempt to combine data values from two or more databases. However, prior art databases, as designed and/or configured, are incompatible and not designed and/or configured to support this combining of data values across databases. These data federation methods are a "quick and dirty" approach to data integration when compared to transformative data consolidation methods.

A prior art method used to insure data consistency in two or more data systems is referred to as reference data synchronization. To support reference data synchronization, or Master Data Management (MDM), an MDM database is established to collect reference data from two or more data systems, in an attempt to from a single consolidated version of the reference data for any data system to utilize. Reference data synchronization is based upon transformative data consolidation where data collected from the source data systems are transformed into a form usable in the MDM database. When the consolidated reference data is moved from the MDM database to any requesting data system, the reference data is again transformed into a form usable by the requesting data system. Reference data synchronization methods only insure that reference data is consistent across data systems but does not allow for enforcing data integrity between data systems or the formation of data system access paths between multiple data systems such as integrated databases for example.

SUMMARY OF THE INVENTION

One or more embodiments of the present invention include a method of designing and/or configuring a set of integrated data systems where data from any integrated data system may be directly and dynamically combined with data from any other integrated data system. The methods used to design and/or configure a set of integrated data systems are based upon integrated data models formed using enhanced data modeling methods.

To support the formation of an integrated data system, prior art data modeling methods are enhanced to focus upon designing and/or configuring data system interoperability through a method of master reference data standards established with integrated data models. These master reference data standards (MRDS) are integrated data model components that incorporate the structural metadata, a specific plurality of unique master reference data records that may be stored in a master reference data standard table or a master reference data standard file, and a specific set of methods needed to support data compatibility and functional interoperability among integrated data systems.

One or more embodiments of the present invention include methods to represent all types of data in integrated data models. Established data modeling methods were engineered to support the design and/or configuring of database type data systems. Within one or more embodiments of the present application, prior art data models are enhanced to support the configuration of all integrated data systems. Using integrated data models, all types of data content that may be stored in computer memory may now be designed and/or configured to form integrated data systems that include data content data files such as document data files, spreadsheet data files, webpage data files, picture data files, audio data files, and video data files as well as database tables for example. Now, any type of computerized data system may be modeled within integrated data models.

One or more embodiments of the present invention include methods of combining multiple integrated data systems that are all populated with data values into a single integrated data system that is populated with the data values combined from the original integrated data systems. The single integrated data system will also remain integrated with other integrated data systems in that data integrity between integrated data systems will be maintained.

A computer processor may be programmed by computer software stored in computer memory, to define integrated data models, automatically or in response to a computer user's inputs through a computer interactive device, such as a computer keyboard, a touch screen monitor, or a computer mouse.

BRIEF DESCRIPTION OF THE DRAWINGS

FIG. 12 depicts three detailed MRDS tables, from the same MRDS specification, where the three MRDS tables are data system instantiated in three separate but integrated databases and where all three MRDS tables are populated with data records from a common unique master reference data source, such as a master reference data standard table or a master reference data standard file, and these populated MRDS tables may be stored in a computer memory of the apparatus of FIG. 1;

FIG. 13 depicts a flow chart of a method for consolidating two integrated data systems populated with data values, such as the two databases depicted in FIG. 10, into a single integrated and consolidated data system populated with a consolidation of data values, such as depicted in FIG. 11, where the method may be executed on a computer processor of the apparatus of FIG. 1 with computer user interaction on an interactive device of the apparatus FIG. 1;

DETAILED DESCRIPTION OF THE DRAWINGS

The present application incorporates by reference U.S. patent application Ser. No. 16/531,652, filed on Aug. 5, 2019, titled "A METHOD AND APPARATUS FOR IMPLEMENTING A SET OF INTEGRATED DATA SYSTEMS" inventor and applicant Robert Mack; U.S. patent application Ser. No. 14/496,342, filed on Sep. 9, 2014, titled "A METHOD AND APPARATUS FOR IMPLEMENTING A SET OF INTEGRATED DATA SYSTEMS" inventor and applicant Robert Mack; U.S. patent application Ser. No. 13/746,083, filed on Jan. 21, 2013, titled "A METHOD AND APPARATUS FOR DEFINING COMMON ENTITY RELATIONSHIPS", inventor and applicant Robert Mack; and U.S. patent application Ser. No. 13/152,683, filed on Jun. 3, 2011 titled "METHOD AND APPARATUS FOR CONVERTING HETEROGENEOUS DATABASES INTO STANDARDIZED HOMOGENEOUS DATABASES", inventor and applicant Robert Mack.

Figure 1:
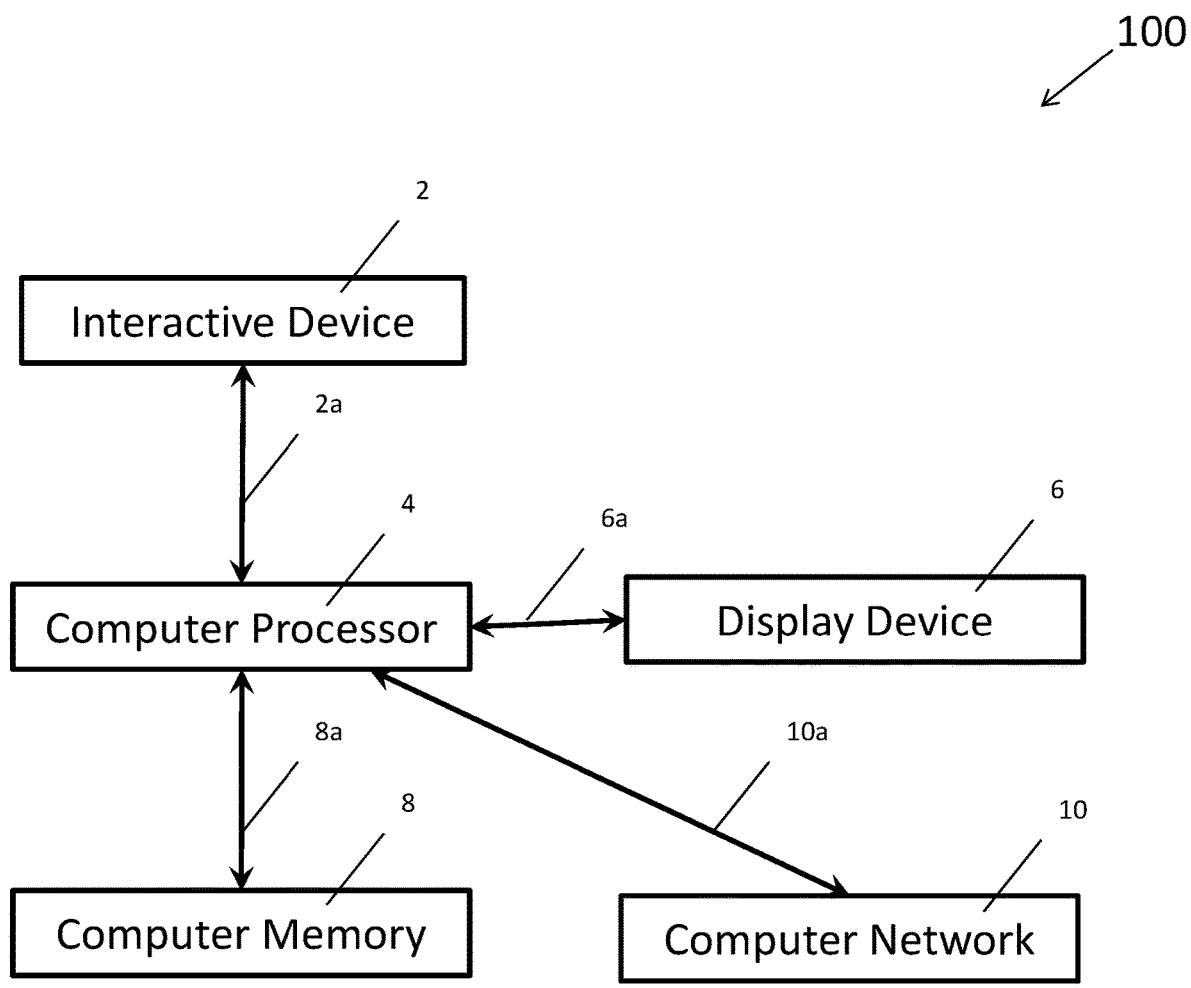
FIG. 1 shows a diagram of an apparatus in accordance with an embodiment of the present invention.

In the present application the following terms have the following definitions:

Alternate key—In an entity-relationship diagram (ERD), a data entity's alternate key is a unique key, stored in one or more computer memories, such as a computer memory 8 in FIG. 1, that is declared by the computer user in the ERD as an alternate method of selecting unique data records from a resultant database table by a database management system (DBMS) in one or more computer memories. In FIG. 1, the computer memory 8 may actually include one or more computer memories. A database table's alternate key is a unique index associated with the database table in one or more computer memories by the DBMS implemented by a computer processor, such as a computer processor 4 in FIG. 1 and used to select unique data records from the database table.

Common data entity—A common data entity is a data entity used in two or more ERDs, where the common data entity is configured to support interoperability between integrated data systems and where the common data entity also defines a source of unique common data records that is used to populate the common data system's database tables that are data system instantiated from the common data entity. A common data entity must have at least one unique key defined that is the basis of a common entity relationship between copies of the same common data entity. A common data entity is normally defined within one organization to be shared in the ERDs of the organization as a basis for integrating the data systems of that organization.

Common database table—A common database table is a database table that may be stored in one or more databases, by the DBMS computer software, where identical copies of common database tables contains one or more common database table unique indexes that are populated, using the DBMS, with data records from a common set of unique data records. Common database tables are used to create "peer-to-peer" data system access paths between two or more integrated databases. Common database tables are used to support data compatibility among integrated databases but do not normally support database consolidation methods because of primary key data value incompatibilities that impact database consolidation but that does not impact the data federation of compatible databases.

Common entity relationship—A common entity relationship is a peer-to-peer type of entity relationship, defined by the computer user in one or more computer memories, wherein each common entity relationship is associated with a common data entity or an MRDS entity that includes a declared unique key as defined within the ERD, where the unique key exists in the common data entity or the MRDS entity prior to adding the common entity relationship. Since a common entity relationship is a peer-to-peer relationship, data attributes are never inherited as foreign key data attributes with any common entity relationship. A common entity relationship, being a peer-to-peer type relationship, is used to link two or more data entities while a data entity relationship may only link up to two data entities.

Content Management System (CMS)—A content management system is a computer based data system that supports the management of shared computer storage for data content data files such as document data files, web page data files, spreadsheet data files, photograph data files, and video data files for example. A CMS stores important metadata associated to each instance of data content data files including metadata that uniquely identifies each data content instance and the unique data content computer memory location of each data content data file. The database of data content data file metadata, such as a data content table, is also searchable so that like data content may be gathered. If properly designed and/or configured, an integrated content management system may be integrated with other integrated data systems.

Data consolidation, Non-Transformative—Non-Transformative data consolidation is a new process of implementing a single consolidated integrated data system that is populated with data records consolidated from two or more source integrated data systems that were both populated with compatible data records. Both source integrated data systems must each contain an MRDS table that is common to the source integrated data systems where each MRDS table was populated with data records from a unique plurality of master reference data records as specified for that MRDS table. Since the source data systems were configured as integrated data systems, both the data structures and the data records may be combined into a single data structure and a single set of data records without the need for data transformations. This data consolidation process is dependent upon the proper integrated data system configuration methods and the proper integrated data records management methods.

Data consolidation, Transformative—For the purposes of this patent, transformative data consolidation is a prior art data integration method where data from one or more data systems are extracted and transformed into a form compatible with a data consolidation data system into which the transformed data values are then loaded. This transformative data consolidation method is also referred to as an Extract, Transform, and Load (ETL) data integration method. For transformative data consolidation, neither the data structures nor the data values of the source data systems are compatible. As such, the extracted data values need to be transformed into a form compatible with the target data system's data structure. The data values need to be transformed into a form compatible with the data values of all other transformed source data systems so that the data values may be consolidated into a single data system.

Data content entity—A data content entity is a new ERD object used to represent different types of data content data files not utilized with prior art data modeling methods, such as picture data files, video data files, document data files, webpage data files, spreadsheet data files, audio data files, and presentation data files for example. While prior art ERDs produced with prior art data modeling methods focused upon database type data, integrated data modeling methods now allow for configuring integrated data systems for all types of data content using data content entities or some other representations for non-database types of data.

While the ERD is a graphical representation within a data model, data content entities will need special metadata collected and stored in the data model's repository of metadata. Some of the metadata needed for the data content entity is a unique identifier for the data content entity, the types of data represented by the data content entity, and the unique data content computer memory location for each data content data file.

Data entity—A data entity is a basic component of an ERD that can be displayed on a display device 6 of the apparatus 100 of FIG. 1 and that is stored in a computer memory such as the computer memory 8 of the apparatus 100 shown in FIG. 1. Each data entity of the ERD will be given a name to uniquely identify that data entity from all other data entities of the ERD. When the data system is formed from the ERD, each data entity typically is data system instantiated in the data system as a single data system data file or as a single database table in computer memory. In addition, a data entity includes a list of data attributes, which, when the data system is formed, becomes the list of data fields in a data system data file or as database table columns within the database table formed from that data entity. Each data entity generally has a primary key declared based upon one or more of the data attributes listed for that data entity. Each data entity may also have alternate keys declared also based upon one or more of the data attributes listed for that data entity. When the data system is formed from the ERD, the primary key and the alternate keys are typically data system instantiated as unique indexes for the data system data file or for the database table formed from that data entity.

Data entity relationship—A data entity relationship is a connector or link, which is stored in one or more computer memories, such as in computer memory 8, between one or two data entities in an ERD. A data entity relationship linking a data entity with itself is often referred to as a recursive data entity relationship. A data entity relationship provides a designed and/or configured data access path between one or two data entities. The data entity relationships are depicted graphically in ERDs of this patent, as lines that begin attached to a first data entity and end with a filled circle on the dependent data entity. A data entity relationship causes the data modeling program to duplicate the primary key data attributes or to duplicate an alternate key data attribute from a first data entity into the data entity that is dependent on that first data entity. These duplicated key data attributes do not exist in the dependent data entity prior to adding the data entity relationship. The computer processor 4 may be programmed by data modeling computer software to permit a user via interactive device 2 to make data entity relationships between data entities. The user, via interactive device 2, may select which of a first data entity's key data attributes will be duplicated by the data modeling computer software. These duplicated key data attributes are referred to as a foreign key data attributes in the dependent data entity. Upon data system instantiation, each data entity relationship from the ERD is normally data system instantiated as a foreign key constraint, in one or more computer memories, such as computer memory 8.

Data federation—Data federation is a prior art method of data integration where data values from multiple databases or partial databases are combined, where possible, in volatile computer memory. Data virtualization is also a prior art method that is an expanded form of data federation where data incompatibility is programmatically transformed from these multiple databases into a compatible and consistent form wherever possible. Unfortunately, data federation methods and data virtualization methods are limited as prior art databases have many incompatibilities that cannot be accurately resolved by these methods.

Data model—A data model is a computer implemented repository of metadata that also normally includes one or more ERDs that can be displayed on the display device 6 of the apparatus 100 of FIG. 1 or stored in the computer memory 8 of the apparatus 100 of FIG. 1. A data model is often developed as a method to design, implement, and maintain one or more data systems using a data modeling program.

Data modeling program—A data modeling program is a computer program, executing on a computer processor such as computer processor 4 in FIG. 1, wherein the data modeling program is used to define and maintain prior art data models. In addition, a data modeling program is also used to data system instantiate a data model into one or more data systems or databases using one or more DBMSs.

Data record—A data record is typically a single row of data values in a database table or a data system data file that is stored in computer memory, such as computer memory 8. Each data record will usually include a primary key value for uniquely identifying that data record. In addition, a data record may include alternate key values to provide alternative methods for identifying unique data records in a computer memory, such as computer memory 8 in FIG. 1. A data record may also include foreign key values or common index sets to allow linking of data records from multiple database tables or from multiple data system data files.

Data system—For the purposes of the present patent application, a data system is any representation of data content in a computer based system. Data systems include databases, CMSs, and computerized data content data files, of digitized picture data files, audio data files, and video data files for example.

Data system access path—A data system access path is a designed and/or configured peer-to-peer type linkage between two or more integrated data systems. Data system access paths are designed and/or configured in integrated ERDs as common entity relationships. Integrated data systems may be integrated database systems or other types of integrated data systems such as an integrated data content management system for example. Data system access paths provide a reliable linkage for combining data records from multiple integrated data systems. For example, when a first MRDS table in a first integrated database contains a first unique master reference data record that is the same first unique master reference data record of a first copy of the first MRDS table in a second integrated database, these two first unique master reference data records may be directly joined. This direct joining of a single unique master reference data record between the first MRDS table of the first integrated database and the first copy of the first MRDS table in the second integrated database allows for data records from both integrated databases to be directly combined provided these data records are both related directly to the first unique master reference data record. For this data system access path, any of the plurality of unique master reference data records for an MRDS table or data system data file in any integrated data system may be used to form direct joins with any of the same unique master reference data records in any copies of the same MRDS table or data system data file in any integrated data system.

Using a data system access path, a set of data records from a first integrated data system may be joined to the set of data records of any other integrated data system linked by the same data system access path to form a single concatenated set of data records. A joining of the first set of data records to the second set of data records is based upon common data values in both the first set of data records and in the second set of data records. The joined sets of data records are formed into a single result set of metadata and data records that can be displayed on the display device 6 of the apparatus 100 of FIG. 1 or stored in a computer memory 8 of the apparatus 100 of FIG. 1.

Data system instantiation—The process of data system instantiation is used to construct data system objects, such as structured data system data files and data system data file indexes, in one or more computer memories such as computer memory 8 for apparatus 100 depicted in FIG. 1. These data system objects are created, maintained and deleted by computer software programs, which may be executed within computer processor 4 and stored in computer memory 8. In some cases, the data system may be a database or an integrated database. In the case where the data system is a database, the term database instantiation may be used to be more specific.

Data value—A data value is usually an alphanumeric string stored in a specific location in a computer memory such as a named data field. For example, a data value may be stored in a data field of a data entry form in a computer memory or in a specific cell of a spreadsheet or in a specific data column of a specific data record of a database table in computer memory. The interpretation of the actual value of the alphanumeric string is dependent upon the data type of the data field. For example, if the data type of a data field is numeric, only valid numeric values will be accepted into the data field. If the data type of a data field is a date, only valid date alphanumeric strings will be accepted into the data field.

Database—A database is generally a structured grouping of data values typically stored in a computer memory and organized for convenient data value access by a DBMS. More specific to the present patent application, a database is a defined data structure, generally stored in a computer memory, comprised of database tables, MRDS tables, common database tables, database table columns, database table indexes, database constraints, and other database objects defined using an computer-based DBMS.

Database management system (DBMS)—A DBMS is a computer software application or software program stored in one or more computer memories, such as one or more of computer memory 8, and executed by a computer processor such as processor 4 of FIG. 1 for maintaining database objects, such as common database tables, database table indexes, and foreign key constraints as well as database data values that are populated into the database tables.

Database table—A database table is a database object used to store sets of data values, in one or more computer memories. Each set of data values represents a horizontal row of the database table often referred to as a database table's data record. Each data value of these data records is represented as a labeled vertical column of the database table. Each data value, of a specific data record, may be addressed, in one or more computer memories by using the label of said vertical column.

Database table index—A database table index is a type of database object associated to a database table stored in computer memory using a DBMS. A database table index may be comprised of a single database table column of data values or be comprised of multiple database table columns of data values from the same database table. A database table index may be configured to be a unique database table index in the sense that the database table index uses a data value only once per database table index, or designed and/or configured as a non-unique database table index, which may repeat data values in that database table index. The DBMS is normally used to maintain the integrity of all database table indexes which are stored in one or more computer memories. Database table indexes are used to maintain the data value integrity of the database table data records as well as to aid in the rapid retrieval of specific data records from an indexed database table.

Enterprise Data Model—A prior art type of data model intended to encompass the entire scope of an enterprise from which multiple databases are often data system instantiated. However, these multiple databases were no more integrated than those designed and/or configured in multiple data models since prior art data models do not address the factors critical to forming integrated databases.

Entity-Relationship diagram (ERD)—An entity-relationship diagram is a graphical depiction of a data system configuration that includes data entities, and data entity relationships that can be displayed on the display device 6 of the apparatus 100 of FIG. 1 or stored in a computer memory 8 of the apparatus 100 of FIG. 1. The depicted data entities represent potential database tables to be data system instantiated. The depicted data entity relationships represent potential foreign key constraints to be data system instantiated into the same database and used to maintain referential integrity between the data system instantiated database tables. An ERD, in at least one embodiment of the present invention, is always stored within a repository of metadata, commonly referred to as a data model, along with other metadata required to data system instantiate a data system.

Entity-Relationship diagram, federated—A federated ERD (entity-relationship diagram) is a new representation of integrated ERDs, which are formed from two or more integrated ERDs where common entity relationships are also shown. A federated ERD is normally a computer-generated diagram of a group of selected integrated ERDS where the common entity relationships are programmatically determined based upon metadata information associated with each integrated ERD.

Entity-Relationship diagram, consolidated—A consolidated ERD (entity-relationship diagram) is an integrated ERD formed from two or more integrated ERDs. The consolidated ERD method may be used to form a single data system from multiple integrated data systems. For example, a first integrated data system and a second integrated data system that are both populated with data vales may be reconfigured or consolidated to form a third integrated data system that is populated with data values from both the first and the second integrated data systems.

First the data entities and the data entity relationships from the source integrated ERDs are copied into a blank ERD. To form a consolidated ERD, duplicate common MRDS entities and duplicate common data entities need to be removed from the consolidated ERD. For each set of duplicate common data entities, their data entity relationships need to be consolidated onto one of the set of common data entities and the duplicate common data entities from that set of common data entities that no longer have data entity relationships are removed from the consolidated ERD. Once the duplicate common data entities have been removed from the consolidated ERD, the duplicate MRDS entities need to be removed. For each set of duplicate MRDS entities, their data entity relationships need to be consolidated onto one of the set of MRDS entities and the duplicate MRDS entities from that set of MRDS entities that no longer have data entity relationships are removed from the consolidated ERD. The resultant consolidated ERD is now an integrated ERD that may be used in the same manner as any other integrated ERD.

Foreign key—A foreign key provides a link between two data entities that is represented by a data entity relationship in an ERD. The data attributes from the primary key or a selected alternate key of a first data entity are duplicated into a second data entity which is now dependent upon the first data entity. These duplicated data attributes are referred to as foreign key data attributes. This link or data entity relationship, when data system instantiated, declares a foreign key constraint that enforces referential integrity between the two database tables that result from the first data entity and from the dependent second data entity. Foreign key data attributes, when data system instantiated, become foreign key database table columns in the database table formed from the dependent second data entity.

Foreign key constraint—A foreign key constraint is declared in a DBMS as a means of implementing and maintaining database referential integrity between two sets of data records each of which is most often contained within two different database tables. A foreign key constraint is normally designed and/or configured in an ERD as a data entity relationship usually between at most two data entities. Foreign key constraints are stored in computer memory and are used by the DBMS to enforce database referential integrity rules for creating, updating and deleting data records. Foreign key constraints are extremely important within a database because only data record sets with enforced referential integrity may be reliably joined to form a consistent, combined set of data records. Each foreign key constraint in a database provides a bidirectional data access path for combining the data records from at most two database tables.

Integrated data model—An integrated data model is a repository of metadata developed using established data modeling methods that are enhanced to support common entity relationships, MRDS entities, common data entities, and data content entities. Integrated data models are used to design and/or configure integrated data systems and to support the methods of standardized data integration.

Integrated data system—For the purposes of this present patent application, an integrated data system is a computerized data system that is compliant with a set of master reference data standards (MRDS). Integrated data systems are designed and/or configured to support interoperability between data systems where data records from a first integrated data system may be directly joined, using designed and/or configured data system access paths, with data records from any other so designed and/or configured integrated data system.

Master reference data—Master reference data is a set of data records, stored in a master reference data standard table or a master reference data standard file, used to define and uniquely identify all relevant instances of specific fundamental objects such as a residential address or a person or an organization for example. In this present patent application, master reference data is combined with specifically-designed and/or configured structural metadata to form reusable MRDS data model components for use in integrated data models.

Master reference data integrity—For the purposes of this present patent application, master reference data integrity is the process of ensuring that the master reference data is used consistently among all integrated data systems. Only when master reference data integrity is properly enforced between integrated data systems are the data system access paths between integrated data systems properly supported and these integrated data systems may be properly joined. Master reference data is a key to standardized data integration and the master reference data integrity rules and methods should be addressed in the MRDS specification.

Master Reference Data Standard (MRDS) Entity—An MRDS entity is an enhanced ERD component formed using integrated data modeling methods for a specific master reference data subject area that should be designed and/or configured in accordance with an MRDS specification. The MRDS entity is designed and/or configured to be used with a multitude of data systems to support standardized data integration.

While there are similarities between an MRDS entity and a common data entity in that each is used to configure interoperability between databases, they differ in purpose. The purpose of a common data entity is to provide data system compatibility, for a set of data systems, in subject areas where MRDS entities have not been developed.

Master reference data standard (MRDS) Specification—For the purposes of this present patent application, an MRDS specification is a requirements document for a specific subject area of master reference data that may then be used to develop reusable MRDS data model components and MRDS integrated data system components for the purposes of implementing integrating data systems. Each MRDS specification document should address the structural metadata requirements, the master reference data set requirements, and the methods required to support the interoperability between integrated data systems. The MRDS specifications become the blueprint for implementing standardized data integration for a specific subject area of master reference data.

Primary key—A primary key is comprised of one or more data attributes within a data entity that are declared in a data model by data modeling software executing on computer processor 4 which is programmed to store the declared primary key in computer memory, such as computer memory 8 of FIG. 1. The primary key of a given data entity is the primary method of uniquely identifying data records within a database table. A data entity's primary key is data system instantiated as the primary unique index of the database table that was data system instantiated from the given data entity. The primary unique index of a given database table is used as a means of rapidly selecting unique data records from that database table.

Reference data synchronization—Reference data synchronization is a prior art method used to manage reference data across prior art data systems. Since prior art data systems were not integrated, there was no data integrity enforcement across data systems to ensure that reference data was consistently applied in each data system. Reference data synchronization, or master data management (MDM) of one or more embodiments of the present application, is a reference data cleansing method where an MDM database is created to collect reference data from multiple incompatible data systems. The reference data from each incompatible data system is collected and transformed into a form compatible with the MDM database before being stored in the MDM database. Once the collected reference data has been cleansed, it is returned to each incompatible data system after again being transformed into a form compatible with that target data system. Unfortunately, reference data synchronization does not enforce data integrity across data systems and does not form data system access paths between data systems.

Referential integrity—Referential integrity is a process, often managed by the DBMS, which is used to insure the consistency and integrity of data values stored within a computer memory as a database. Database referential integrity is related to joining data records stored in a database table to the data records stored in another database table such as two database tables related by a foreign key constraint.

Repository of metadata—a repository of metadata is an area of computer memory used to store various metadata and information about data systems. For this patent application, a data model is a repository of metadata that contains ERDs, integrated ERDs, data content related metadata and other such metadata needed to support integrated data modeling and standardized data integration methods.

Standardized data integration—Standardized data integration is a new data integration method where data integration standards are provided such that any data system which is compliant with these data integration standards is integrated with any other compliant data system.

For the present patent application, the data integration standards are often developed as MRDS specifications and MRDS entities and then implemented as MRDS data system components such as MRDS tables or as MRDS files for example. These MRDS entities become a part of integrated data modeling methods which support standardized data integration. Standardized data integration supports both data federation of integrated data systems and non-transformative data consolidation forms of data integration.

Unique Index—A unique index is a database object used to constrain the set of data values for a database table or for a data system data file stored in one or more computer memories, wherein no duplicate data values are allowed in the unique index. For each unique index, the combination of indexed data values for each data record must form a unique index entry for that database table or data system data file. Any attempts to form a duplicate combination of data values for any unique index will be rejected by the computer programmed to reject duplicate data values, such as executed by the computer processor 4.

Unique Key—A unique key is declared in an ERD on one or more data attributes of a data entity. This unique key is declared to indicate that, upon data system instantiation, a unique index will be implemented based upon the database table columns formed from the one or more attributes of the data entity for the database table data system instantiated from that data entity.

FIG. 1 shows a diagram of apparatus 100 in accordance with an embodiment of the present invention. The apparatus 100 includes an interactive device 2, a computer processor 4, a display device 6, a computer memory 8 and a computer network 10. Computer memory 8 may include any type of computer memory, including long term memory such as disk memory in addition to computer random access memory which may lose its values when power is removed. The computer memory 8 may include one or more computer memories. The computer network 10 is used to provide a communication link to one or more other computer processors and their associated devices and computer memory. The interactive device 2, the display device 6, the computer memory 8 and the computer network 10 communicate with the computer processor 4 via communications links 2a, 6a, 8a, and 10a respectively, which may be electronic, computer software, optical, wireless or any other type of communications links. The computer processor 4 may be programmed by computer software to implement the method of integrated data model development and integrated data system implementation in accordance with one or more embodiments of the present invention to produce integrated data models and integrated data systems in the computer memory 8, such as shown by FIG. 1.

Figure 2:
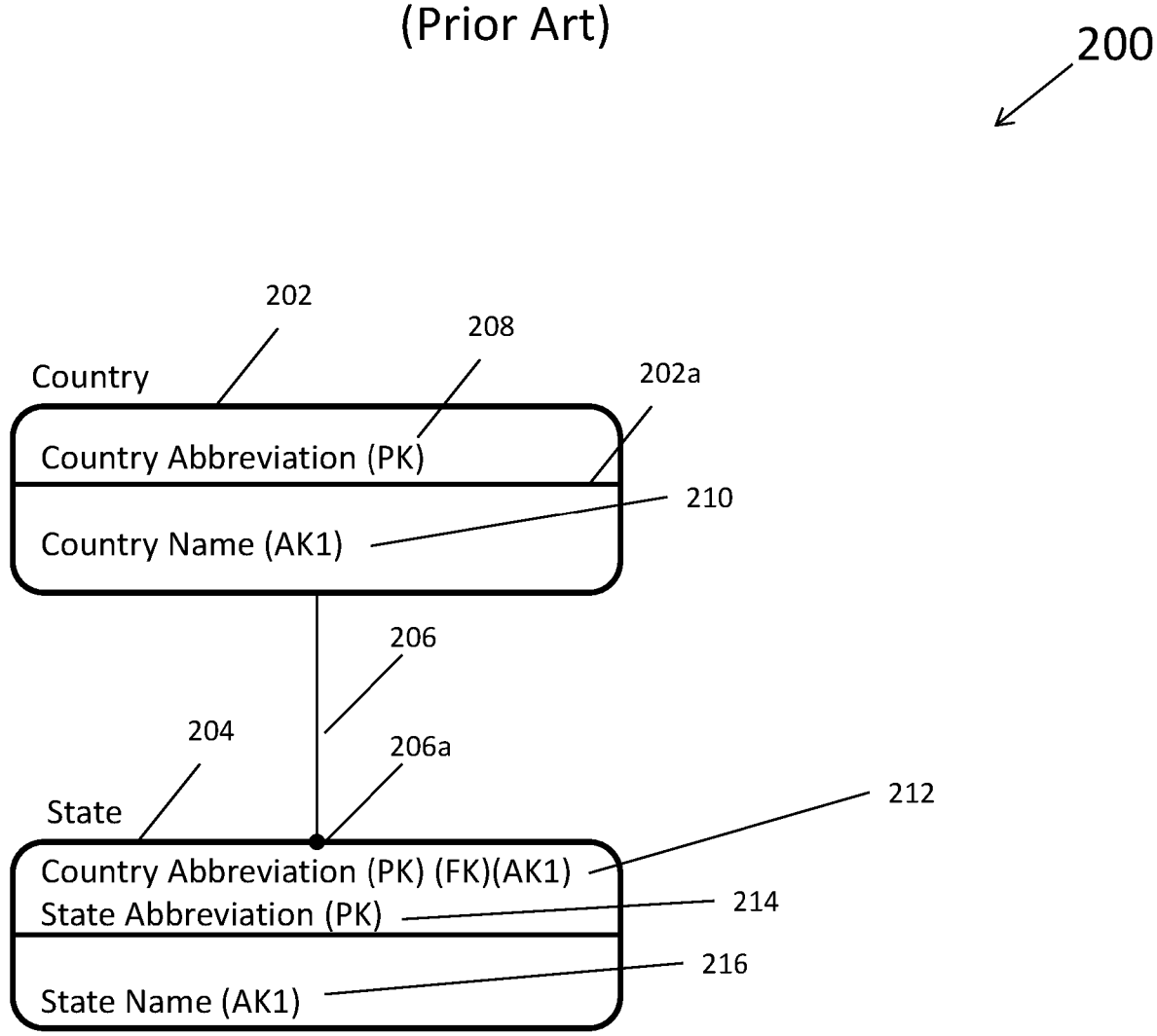
FIG. 2 depicts a prior art simple entity-relationship diagram (ERD) of a country data entity and a state data entity and a data entity relationship linking the two data entities together that can be displayed on a display device of the apparatus of FIG. 1 or stored in a computer memory of the apparatus of FIG. 1.

FIG. 2 shows ERD (entity-relationship diagram) 200, which may be created by a computer user using a data modeling program and the ERD may be stored in the computer memory 8 of FIG. 1. The ERD 200 contains two data entities, data entities 202 and 204, combined with a single data entity relationship 206 that connects these two data entities. In this representation of an ERD, ERD 200, each of data entities 202 and 204 are represented by a rounded-corner rectangle while the data entity relationship 206 is represented by a line terminated with a filled circle 206a. Each data entity, such as each of 202 and 204, represents a group of related data attributes, such as the data attribute 210, which is labeled country name, and data attribute 208, which is labeled country abbreviation, for data entity 202. In this notation of data entities, the data attributes above a line in the rounded-cornered rectangle, such as for example, above line 202a for data entity 202, are declared to be the primary key of the data entity. The primary key data attributes of each data entity are also denoted as such by the (PK) which follows the data attribute's name. This primary key is a declared unique identifier for the data entity. In addition to the data entity's declared primary key, each data entity may have zero, one or more alternate keys defined. In FIG. 2, both data entities 202 and 204 contain a single alternate key denoted by the (AK1) following the alternate key's data attributes. In data entity 202, the alternate key is declared by a computer user using a data modeling program upon the single data attribute 210, which is labeled country name and stored in computer memory 8. In data entity 204, the alternate key is a composite alternate key comprised of the data attribute 212, which is labeled country abbreviation, and data attribute 216, which is labeled state name. The data entity relationships of ERDs, such as ERD 200, depict a link, normally between two data entities, that allow data attributes from a first data entity, such as data entity 202, to be related to data attributes from the second data entity, such as data entity 204. Under some circumstances, a data entity relationship links one data entity to itself in what is often referred to as a recursive data entity relationship. Each data entity relationship links at most two data entities.

Data entity relationship 206, shown in FIG. 2, links the first data entity 202 to the second data entity 204. Note that the data entity 204 contains data attribute 212, denoted by (FK). Data attribute 212 is inherited from the primary key of data entity 202, which is data attribute 208, wherein the data attribute inheritance is implemented by the data modeling program executing on computer processor 4. This inheritance of a first data entity's primary key data attributes or one of that data entity's alternate key data attributes into a second data entity is referred to as a foreign key thus the denotation of (FK). The data entity that donates unique key data attributes, such as data attribute 208 of data entity 202, is referred to as the parent data entity while the data entity that inherits the data attributes, such as data attribute 212 of data entity 204, is referred to as the child data entity. Prior art data entity relationships, that enforce referential integrity between data entities, are parent-child type of data entity relationships where unique key data attributes are always inherited by one of the related data entities. In the case of the recursive data entity relationship, the parent data entity and the child data entity are the same data entity, but that data entity still inherits the unique key data attributes as foreign key attributes.

Figure 3:
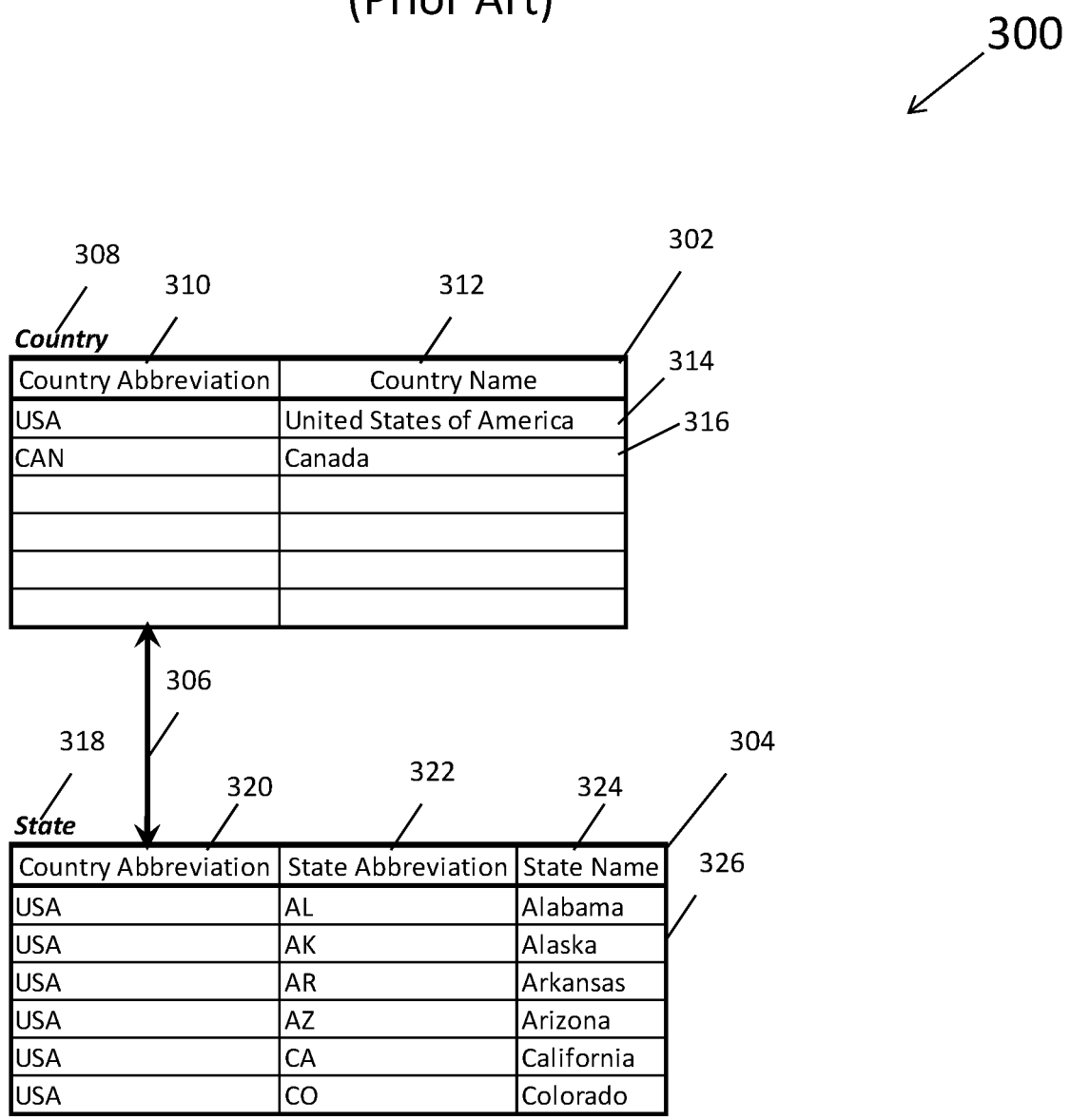
FIG. 3 depicts a prior art pair of database tables linked by a foreign key constraint that was data system instantiated from the ERD shown in FIG. 2 and where the database tables were also populated with data values, and where the database tables with their data values can be displayed on a display device of the apparatus of FIG. 1 or stored in a computer memory of the apparatus of FIG. 1.

FIG. 3 is database 300 that results from the data system instantiation, in one or more computer memories, such as computer memory 8 of FIG. 1, of ERD 200 depicted in FIG. 2. Data system instantiation may be computer user initiated using a data modeling program where the data system instantiation is implemented by one or more DBMSs where both the data modeling program and the DBMSs are executed in one or more computer processors, such as computer processor 4 of FIG. 1, and the database objects are stored in one or more computer memories, such as computer memory 8 of FIG. 1. Databases table 302 and 304 are data system instantiated into database 300, in computer memory, such as computer memory 8, from data entity 202 and 204 respectively of ERD 200 shown in FIG. 2. The primary key index of database table 302 is based upon database column 310, which is data system instantiated from primary key data attribute 208 of ERD 200. Database table 304 is data system instantiated into database 300 from data entity 204 in FIG. 2. The primary key index for database table 304 is a composite unique index based upon database columns 320 and 322, which are data system instantiated from primary key data attributes 212 and 214 of ERD 200.

Beyond the database tables, foreign key constraints are another important type of database object that is data system instantiated into any relational database. Foreign key constraint 306 of database 300, shown in FIG. 3, is data system instantiated from data entity relationship 206 of ERD 200 shown in FIG. 2. Again, data system instantiation is normally initiated by a computer user using a data modeling program. Foreign key constraint 306, of database 300 shown in FIG. 3, is data system instantiated to maintain database referential integrity between database column 310 of database table 302 and database column 320 of database table 304. Database referential integrity is normally maintained by a DBMS executing in a computer processor such as computer processor 4 of FIG. 1. Once a foreign key constraint is data system instantiated, the DBMS computer software program executed by computer processor 4, and stored in computer memory 8, is programmed to enforce the referential integrity rules for that foreign key constraint.

In any relational database, the foreign key constraints are important. Foreign key constraints are used within a DBMS to maintain both the database referential integrity of the data records in the related database tables and to provide bidirectional data system access paths between database tables.

In accordance with at least on embodiment of the present invention, a method is provided, which can be called a "method of defining and identifying all data types and forming integrated data systems" in computer memory 8. This method is used to design, implement, and maintain integrated data systems, in computer memory 8, including any types of data content that may be stored in computer memory as a data content data file.

In accordance with at least one embodiment of the present invention, a method is provided, which can be called a "method of defining MRDS (master reference data standard) entities" in computer memory, such as in computer memory 8 of apparatus 100. This method is utilized for configuring, designing, and/or implementing MRDS data system components and integrated data models in one or more computer memories, such as computer memory 8 of FIG. 1, which gives a person who would define integrated data models and MRDS data system components a predefined method to data system instantiate multiple integrated data systems.

Figure 4:
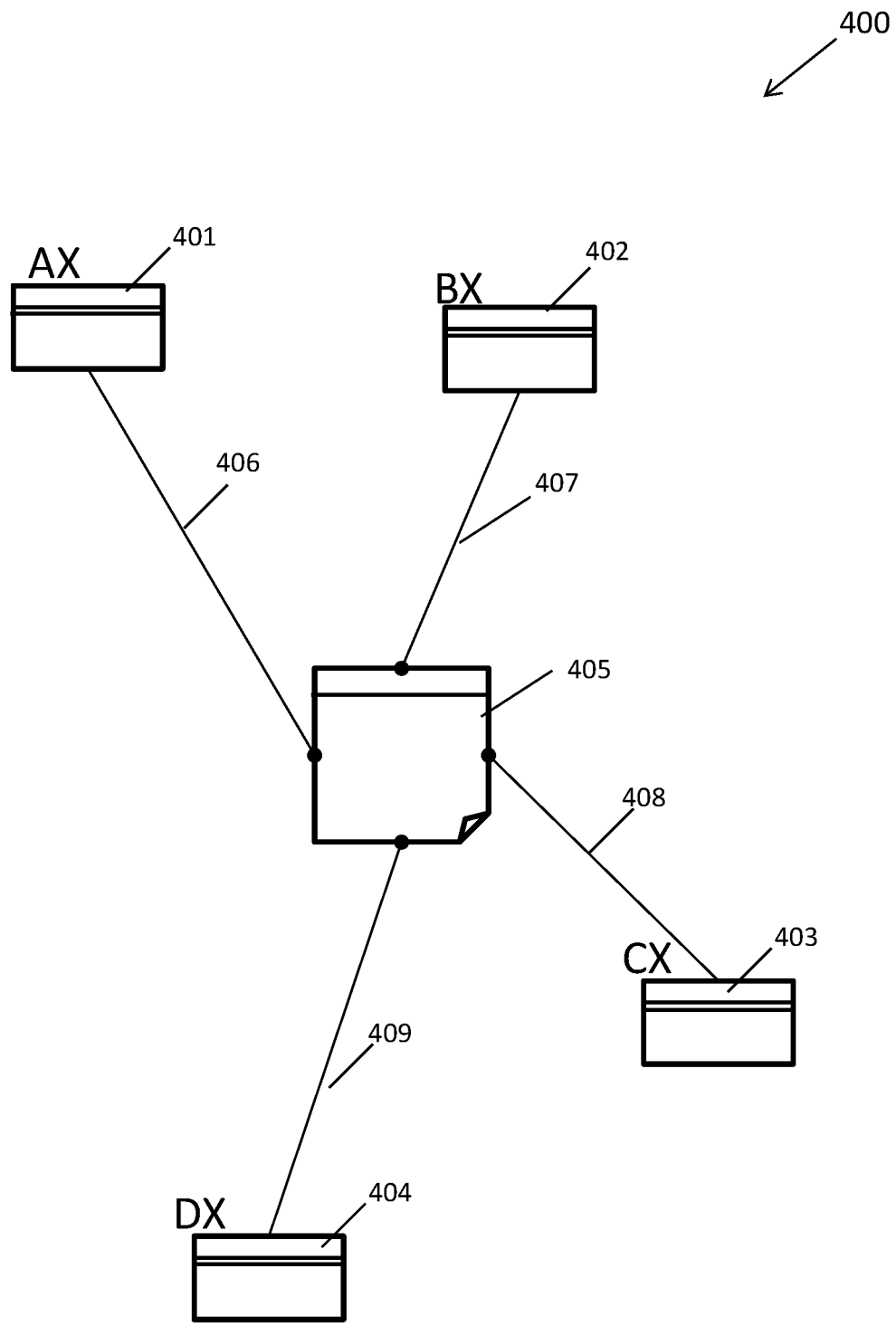
FIG. 4 depicts an integrated ERD, which is based upon MRDS (master reference data standard) entities and a data content entity, that may be used to configure an integrated data system for any and all types of data content data files that may be stored in computer memory where the integrated ERD may be displayed on a display device of the apparatus of FIG. 1 or stored in a computer memory of apparatus of FIG. 1.

FIG. 4 depicts integrated ERD 400 with MRDS entities (401, 402, 403, and 404) and data content entity (405) along with data entity relationships (406, 407, 408, and 409). Both the MRDS entity and the data content entity are new ERD symbols created by this present patent application. For the purposes of this present patent application, the MRDS entity symbol has squared corners and a double line separating the primary key data attributes from the non-primary key data attributes. For the purposes of this patent, the data content entity symbol is a single square with one folded corner and a single line separating the primary key data attributes from the non-primary key data attributes.

With integrated ERD 400, any data types that may be stored in computer memory as data content data files may now be data modeled and represented in an integrated ERD. The data content entity represents any type of data content data files such as document data files, spreadsheet data files, picture data files, video data files, audio data files and webpage html data files for example. The MRDS entities, such as MRDS entities 401, 402, 403, and 404, define the master reference data standards that are the basis of standardized data integration methods.

The data content entity, used in the ERDs of this present patent application, is a symbol for general data content types used in integrated data modeling. This general data content may be documents, web pages, photographs, audio, video, or spreadsheets for example that are stored in computer memory as data content data files. More specific data content symbols that represent a subset of data content may be used in an integrated ERD if desired. For example, a data entity may be considered as a specific data content symbol used in prior art ERDs to specify database type data content for example. The data content entity of the present patent application, has been referred to, in part, previously in the prior art, see for example http://www.kmed.cs.ucla.edu/papers/k0746.pdf, as a multimedia entity. The metadata associated with the data content entity, which would be stored in the repository of metadata commonly referred to as a data model, would identify, define and detail the specifics for the data content instances represented in the data content entity. Each data content entity, such as data content entity 405 in FIG. 4, in one or more embodiments of the present invention, should be associated with a unique data content entity name, and should contain a unique key, such as a primary key or an alternate key, which is used to uniquely identify each individual instance of the data content. In addition, the data content entity, in at least one embodiment of the present application, must also contain the data content instance itself or a unique data content location in computer memory of the data content instance's data content data file so that that data content instance may be displayed as needed when retrieved. If the data content were web pages, for example, the URL "address" of the specific web page's html data content data file could be stored. Of course, the data content entity, such as 405, may also contain other pertinent data attributes as required by the specific type of data content.

The MRDS entity, such as MRDS entity 401 in integrated ERD 400 of FIG. 4, results from standardized data integration methods where any data system that is compliant with the MRDS specifications will be an integrated data system. Each MRDS entity is designed and/or configured specifically to support standardized data integration among all compliant integrated data systems.

The inventor of the present application has done research which has shown that the data universe, the totality of all data and of all metadata, is finite. Therefore, the data universe contains a boundary of data where this boundary data could be characterized as fundamental master reference data. When properly designed and/or configured, all integrated data models should use fundamental master reference data.

The inventor of the present application has done research which has also shown that both the structured data storage area depicted in an ERD and the data set values are important to support data integration and should be designed and/or configured and maintained together for such fundamental master reference data. MRDS entities support the configuration of both the MRDS data structure and the plurality of unique MRDS data records that are stored in computer memory at a uniquely identified master data computer memory location. The MRDS entity, such as MRDS entity 401 in integrated ERD 400 of FIG. 4, represents fundamental master reference data that has been specifically designed and/or configured to support interoperability between integrated data systems. Some interoperability between data systems are supported by common entity relationships that enforce data integrity between integrated data systems and that provide data system access paths between integrated data systems. Different levels of master reference data granularity may exist in multiple integrated data systems so that the MRDS entities must support transitions in master reference data granularity in combining data from one integrated data system to another integrated data system. Some integrated data systems need to retain chronological changes in master reference data while other integrated data systems do not retain this information. Therefore, some MRDS entities are designed and/or configured to support retaining these chronological changes. These are examples of some of the functional interoperability that needs to be addressed in configuring MRDS entities.

ERD 400 is a simple representation for defining all data in the data universe. The MRDS entities (401, 402, 403, and 404) represent the boundary of the data universe and the data content entity represents some specific non-boundary data from the data universe. The data entity relationships depict the direct relation between the data content entity 405 and the fundamental master reference data represented in MRDS entities 401-404.

An integrated ERD, such as integrated ERD 400 depicted in FIG. 4, is a representation of an integrated data model that supports standardized data integration methods. Any integrated ERD that is based upon MRDS entities, such as MRDS entities 401, 402, 403, and 404 of integrated ERD 400 depicted in FIG. 4, may be integrated with any other integrated ERD provided that the ERDs each contain at least one common MRDS entity. Standardized data integration in data models allows for individually developed data models to be combined forming larger data models based upon any common MRDS entities. When integrated ERDs are data system instantiated, these integrated data systems support standardized data integration in both a data federation of integrated data systems approach as well as a non-transformative data consolidation of integrated data systems approach.

Upon data system instantiation of integrated data models, such as the integrated data model represented by enhanced ERD 400 depicted in FIG. 4, the MRDS entities may be data system instantiated as integrated database tables, as metadata tags and master reference data for html data system data files, or in another form of structured data system data files such as XML data system data files for example. These data systems are data system instantiated into computer memory, such as computer memory 8 of apparatus 100 depicted in FIG. 1. To facilitate data integration, it is most important that whatever data storage form the MRDS entities are applied into computer memory, that this data storage form be accessible to other integrated data storage forms. Not only must the plurality of unique master reference data records be consistently applied to multiple data storage forms, but the accessibility between different data storage forms must also be provided to insure that data from one data storage form may be combined or joined with data from another data storage form. For example, two different DBMS product vendors will have their own native forms of structured physical data storage. However, both DBMS product vendors will adhere to the Open Database Connectivity Standards, for example, to insure open accessibility between databases instantiated by their DBMS product. Connectivity standards compliance enables the dynamic and direct combining of data across databases controlled by different DBMSs using a data federation approach for example.

The content data entity may be data system instantiated in a commercially available Content Management System (CMS) such as Microsoft's (trademarked) SharePoint (trademarked). When an integrated CMS supports connections to DBMS databases by compliance with the Open Database Connectivity Standards, any data content in the integrated CMS may now be joined to any appropriate integrated database data records or other compliant integrated data systems.

Figure 5:
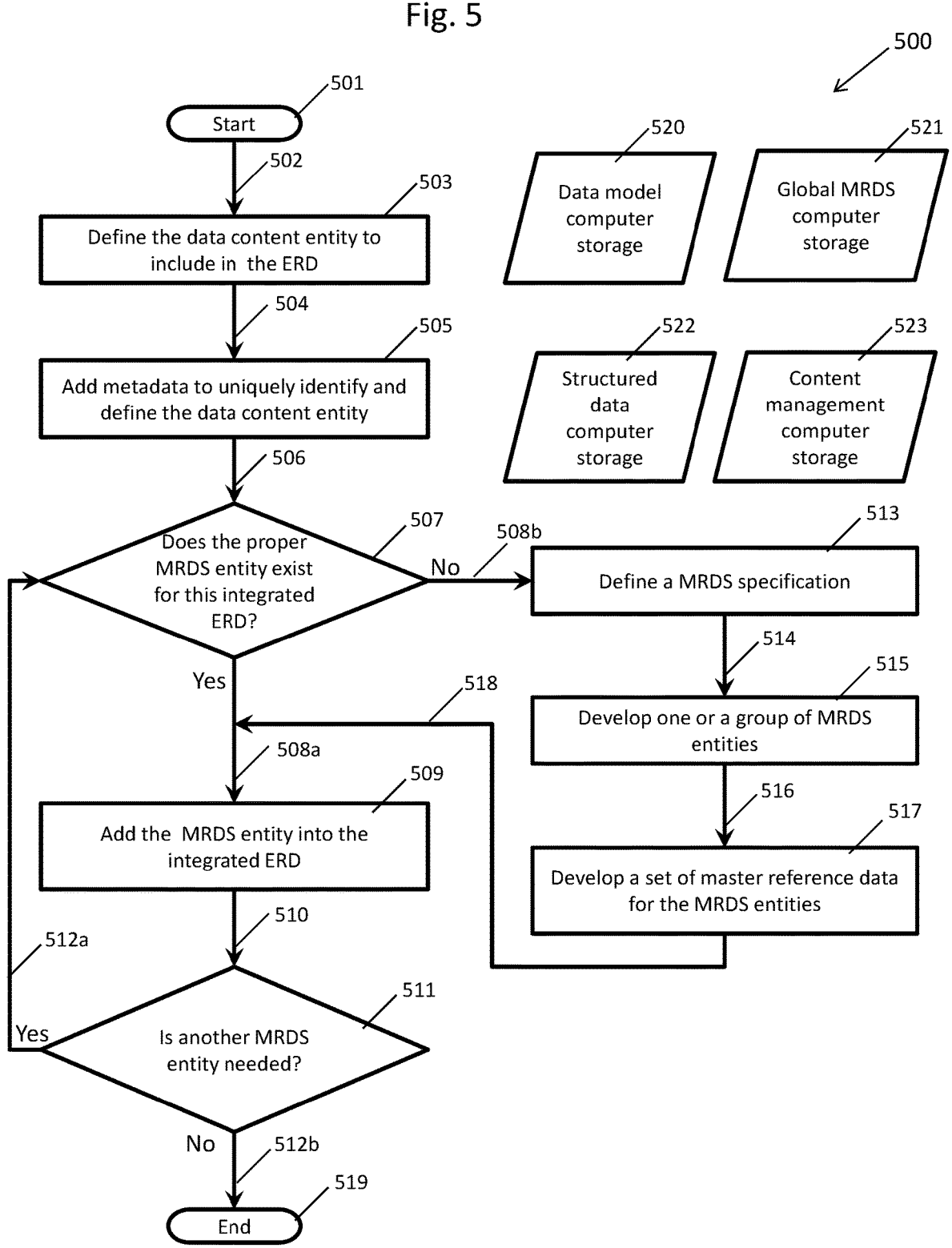
FIG. 5 depicts a flow chart for a method of designing integrated ERDs such as the integrated ERD depicted in FIG. 4, where the method may be executed on the computer processor of FIG. 1 with computer user interaction on an interactive device of FIG. 1.

FIG. 5 depicts flow chart 500 of a method used to define and configure an integrated ERD within an integrated data model, such as integrated ERD 400 depicted in FIG. 4. Flow chart 500 contains flow chart initiator 501, flow chart processes 503, 505, 509, 513, 515, and 517, and flow chart decisions 507, and 511, along with flow chart terminator 519. In addition, flow chart 500 depicts flow chart flows 502, 504, 506, 508a, 508b, 510, 512a, 512b, 514, 516, and 518, along with computer storage areas 520, 521, 522 and 523.

Computer storage areas, such as computer storage area 520, are storage areas that would be implemented in a computer memory such as computer memory 8 of apparatus 100 depicted in FIG. 1. These computer storage areas may also be accessible from other computers using a computer network such as computer network 10 depicted in apparatus 100 shown in FIG. 1. Computer storage area 520, of flow chart 500 depicted in FIG. 5, represents a storage area of the repository of metadata for one or more integrated data models along with their integrated ERDs. Computer storage area 521, of flow chart 500 depicted in FIG. 5, represents a computer storage area for MRDS related information such as MRDS entity 401 depicted in integrated EDR 400 shown in FIG. 4. Since the MRDS entities are reusable in integrated ERDs, data storage area 521 must be accessible to computers that would need access to the MRDS entities. For example, the MRDS entities and their related metadata information, such as the unique master data computer memory location of the unique master reference data records, may be made available on the Internet such as depicted in apparatus 100 of FIG. 1 where computer network 10 provides connection to the Internet. Computer storage area 522, of flow chart 500 shown in FIG. 5, is an area of structured data storage that may be used for database structures and for the data system data files of one or more data systems for example. Access to computer storage area 522 for database structures could be controlled by a DBMS software executing on computer processor 4 also of apparatus 100 depicted in FIG. 1. Access to computer storage area 522 for data system data files of a specific data system would normally be controlled by computer software programmed specifically for that data system. Computer storage area 523, of flow chart 500 shown in FIG. 5, is an area of data storage for CMS related data content data files such as document data files, picture data files, and spreadsheet data files for example. In some cases, CMS software, executing on computer processor 4 of apparatus 100 shown in FIG. 1, could be used to control access to computer storage area 523 of flow chart 500. The content management computer storage area 523 may also be made accessible by other computer processors using computer network 10 as depicted in apparatus 100 shown in FIG. 1.

Flow chart 500, of FIG. 5, begins at flow chart initiator 501 and follows flow chart flow 502 to flow chart process 503. In flow chart process 503, the computer user using integrated data modeling software executing on a computer processor, such as computer processor 4 of apparatus 100 depicted in FIG. 1, defines and configures a data content entity for the integrated ERD, such as data content entity 405 of integrated ERD 400 depicted in FIG. 4. As part of flow chart process 503, the data content entity is created in an integrated ERD as a uniquely named ERD object, and data attributes are added to the data content entity as required by the computer user configuring the data content entity 405. The data attributes of a data content entity would be used to define and identify unique instances of data content and to record the unique data content memory location of the specific data content data file. Once flow chart process 503 has been completed to the satisfaction of the computer user, flow chart flow 504 is followed to flow chart process 505.

In flow chart process 505 of flow chart 500, the computer user declares a unique key for the data content entity that is based upon one or more of its data attributes. A method is defined to link the data content instances, such as a specific spreadsheet instance or a specific document instance, to the data content entity either by direct storage of the data content instances or by indirect storage where a unique data content memory location for the data content data file is used. The integrated data modeling software is then used to store the designed and/or configured data content entity and its metadata in computer storage area 520 along with the integrated ERD and other integrated data model metadata and information. Once flow chart process 505 has been completed, flow chart flow 506 is followed to flow chart decision 507 of flow chart 500 shown in FIG. 5.

In flow chart decision 507 of flow chart 500, an MRDS entity, such as MRDS entity 401 of integrated ERD 400 depicted in FIG. 4, must be added to the integrated ERD, in at least one embodiment of the present application. The computer user decides if the appropriate MRDS entity exists or if a new MRDS entity needs to be designed and/or configured. If the appropriate MRDS entity already exists, flow chart flow 508a is followed to flow chart process 509. If a new MRDS entity must be designed and/or configured, flow chart 508b is followed to flow chart process 513.

In flow chart process 513 of flow chart 500, an MRDS specification would normally be developed before the MRDS entity is designed and/or configured. Configuring a proper MRDS entity is more complex than configuring most data entities since the MRDS entity must be reusable as master reference metadata for a vast majority of integrated data systems instantiated from their integrated data models. As such, this reusable MRDS entity must be designed and/or configured to support enforcement of data integrity between these integrated data systems by defining one or more common entity relationships to be shared by the MRDS entity that may be instantiated as MRDS tables of as MRDS files in each integrated data system. The MRDS specification, in at least one embodiment of the present application, should address the plurality of unique master reference data records and the MRDS data structure along with the multiple data functions that support interoperability and data compatibility among the resultant integrated data systems. Upon completion, the MRDS specification is stored in computer storage area 521. When flow chart process 513 is completed, flow chart flow 514 is then followed to flow chart process 515 as depicted in flow chart 500 of FIG. 5.

In flow chart process 515 of flow chart 500, the MRDS entity or group of related MRDS entities are designed and/or configured to the MRDS specification defined in flow chart process 513. These MRDS entities are designed and/or configured using an integrated data modeling program executing on a computer processor, such as computer processor 4 of apparatus 100 depicted in FIG. 1. A graphical depiction of the MRDS entity is added to an integrated ERD as part of the configuration process and that integrated ERD is included as part of the integrated data model. Once the MRDS entity or group of related MRDS entities have been designed and/or configured, they are stored in computer storage area 521 as part of the integrated data model including the integrated ERD. Once the MRDS entities have been saved, flow chart flow 516 is followed to flow chart process 517.

In flow chart process 517 of flow chart 500, the plurality of unique master reference data records are developed that would be used in conjunction with integrated data systems that are data system instantiated from the associated MRDS entities. The plurality of unique master reference data records should be placed into an MRDS table or an MRDS file to insure total compatibility between the data system structures and the data records. These populated MRDS tables or MRDS files will become the global "golden" copy of the plurality of unique master reference data records to be used by all other integrated data systems that are based upon the same MRDS. Integrated data systems, interacting with the global MRDS tables or MRDS files, may have a complete copy of the plurality of unique master reference data records distributed to them, or may only require a subset of the plurality of unique master reference data records depending upon the number of data records, how much of the plurality of unique master reference data records is needed, and the frequency of chronological changes that impact the freshness of the plurality of unique master reference data records. In any event, the plurality of unique master reference data records stored within its MRDS data structures is a key to compliance with standardized data integration. Once the global MRDS tables or MRDS files and global plurality of unique master reference data records has been defined and developed, that information is stored in computer storage area 521. Once flow chart process 517 is complete, process control is passed to flow chart flow 518 which is followed to flow chart flow 508a where process control continues on to flow chart process 509 as depicted in flow chart 500.

In flow chart process 509 of flow chart 500 shown in FIG. 5, a list of available MRDS entities will be displayed for the computer user to select the one MRDS entity that needs to be added to the current integrated ERD of the integrated data model. The list of available MRDS entities is retrieved from computer storage area 521, which is stored in computer memory 8 of apparatus 100, by computer processor 4 of apparatus 100 under enhanced data modeling program control and displayed on display device 6 of apparatus 100. Using interactive device 2 of apparatus 100, the computer user selects the MRDS entity of interest and a copy of the MRDS entity is added into the current integrated ERD.

MRDSs could be selected from a list or spreadsheet of available MRDSs and related information or could be selected from an ERD which shows only available MRDS entities. The computer user utilizing integrated data modeling software then adds any data entity relationships that are needed to incorporate the selected MRDS entity into the integrated ERD. Once the updated integrated ERD has stored in computer storage area 520, flow chart process 509 is complete. Flow chart flow 510 then passes flow control to flow chart decision 511 as depicted in flow chart 500 of FIG. 5.

In flow chart decision 511 of flow chart 500 shown in FIG. 5, the computer user determines if another MRDS entity is required to complete the integrated ERD. If more MRDS entities are needed, flow control is passed to flow chart flow 512*a* which returns flow chart control to flow chart decision 507. If the integrated ERD is complete, flow control is passed to flow chart flow 512*b*, which passes flow control to flow chart terminator 519.

Interestingly, from the integrated ERD shown in FIG. 4, it can be shown that all integrated ERDs, when properly designed and/or configured, implemented, and maintained, will support data integration with all other integrated ERDs. Since data content entities may be used with all forms of data that may be stored in computer memory, all data in computer memory may now be data modeled using integrated data modeling methods. It is most important that MRDS entities be defined and shared among integrated ERDs as these MRDS entities are the basis of integrated ERD federation and consolidation.

Figure 6:
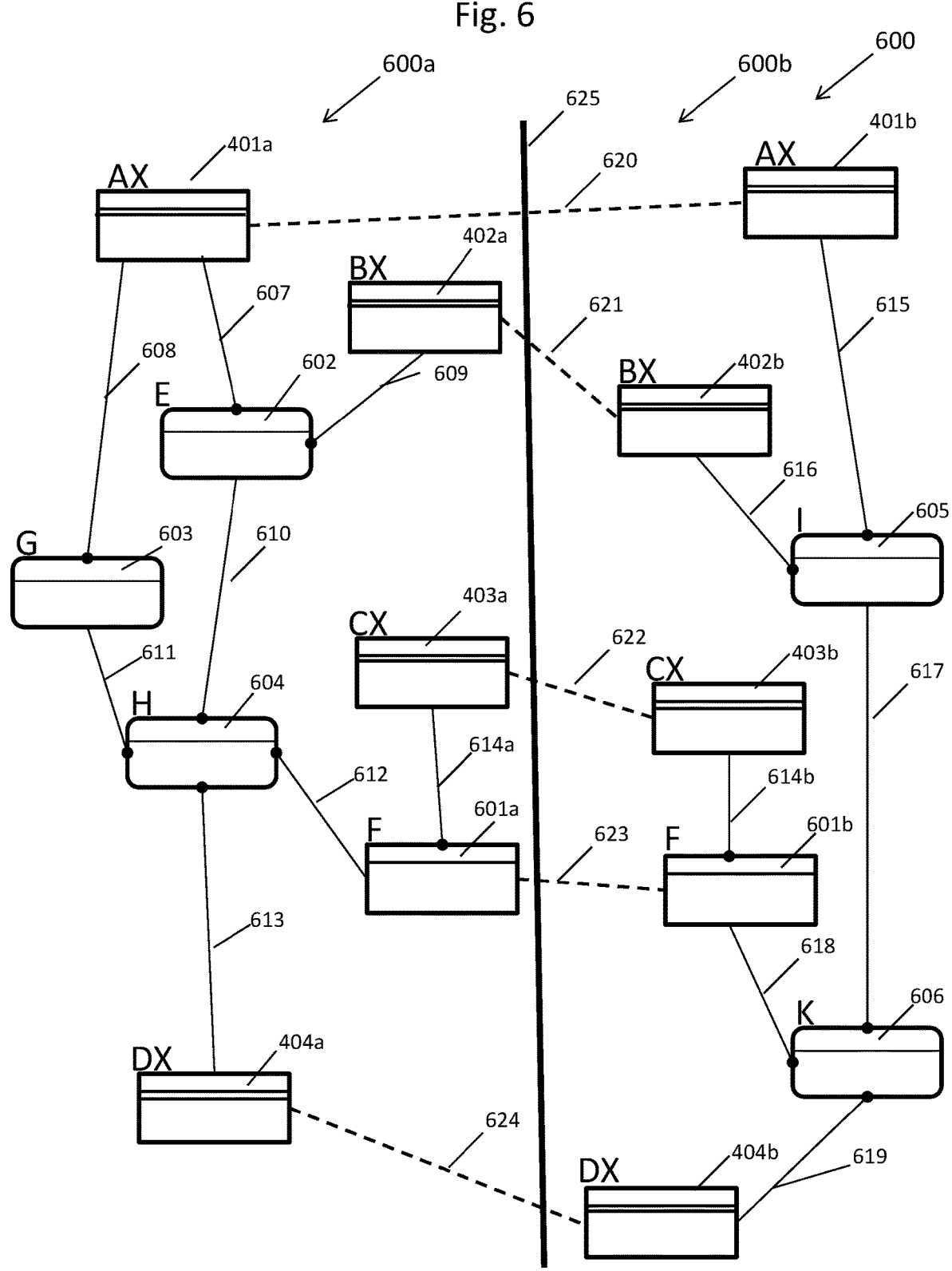
FIG. 6 depicts a federated ERD comprised from two integrated ERDs where the integrated ERDs share five designed and/or configured common entity relationships between them and where the federated ERD's may be displayed on a display device of the apparatus of FIG. 1 or stored in a computer memory of apparatus of FIG. 1.

FIG. 6 depicts a first integrated ERD 600*a* and a second integrated ERD 600*b* in federated ERD 600. First integrated ERD 600*a* is comprised of MRDS entities 401*a*, 402*a*, 403*a*, and 404*a*, from common data entity 601*a* and from data entities 602, 603, and 604. First integrated ERD 600*a* is also comprised of data entity relationships 607, 608, 609, 610, 611, 612, 613, and 614*a*. Second integrated ERD 600*b* is comprised of MRDS entities 401*b*, 402*b*, 403*b*, and 404*b*, from common data entity 601*b*, and from data entities 605, and 606. Second integrated ERD 600*b* is also comprised of data entity relationships 614*b*, 615, 616, 617, 618, and 619. First integrated ERD 600*a* and second integrated ERD 600*b* share common entity relationships 620, 621, 622, 623, and 624.

One form of ERD integration would be the federation of integrated ERDs, such as the federation of integrated ERD 600*a* and of integrated ERD 600*b* shown in federated ERD 600 of FIG. 6. Integrated ERD federation is a method of temporarily joining two or more integrated ERDs into a federated ERD, such as federated ERD 600. Federated ERD 600, shown in FIG. 6, shows the common entity-relationships between integrated ERDs such as common entity-relationships 620, 621, 622, 623, and 624. Any group of integrated ERDs may be federated provided they comply with standardized data integration in that they each share at least one common copy of an MRDS entity such as first copy of the first MRDS entity 401*a* and second copy of the first MRDS entity 401*b* of federated ERD 600. A federated ERD is used to depict common entity relationships between multiple integrated ERDs and could be displayed on a computer display device, such as display device 6 of apparatus 100 depicted in FIG. 1. A federated ERD may also be stored in computer memory such as computer memory 8 depicted in apparatus 100 as shown in FIG. 1.

The integrated ERDs to be federated may exist in a single integrated data model or may exist in multiple integrated data models. Integrated data models need to be used to support federated ERDs as prior art data models do not address the designation of a plurality of unique master reference data records that are needed to support MRDS entities.

Since the two integrated ERDs shown in FIG. 6 share several copies of the same MRDS entities and a set of common data entities, these two integrated ERDs contain the structural metadata commonality and the data record commonality needed to form a federated ERD. In fact, since integrated ERD 400 shown in FIG. 4 shares the copies of the same MRDS entities with the integrated ERD 600*a* and integrated ERD 600*b* of FIG. 6, integrated ERD 400 could also be federated with either integrated ERD 600*a* or 600*b* or federated with both integrated ERDs 600*a* and 600*b* of FIG. 6. When the integrated ERD 400 of FIG. 4 and the 2 integrated ERDs of FIG. 6 are individually data system instantiated, any data values from any of these integrated data systems may be directly and dynamically joined with data from any of the other integrated data systems.

FIG. 6 depicts four sets of MRDS entity copies. The first MRDS entity copies 401*a* and 401*b* both labeled "AX", the second MRDS entity copies 402*a* and 402*b* both labeled "BX", the third MRDS entity copies 403*a* and 403*b* both labeled "CX", and the fourth MRDS entity copies 404*a* and 404*b* both labeled "DX". FIG. 6 also contains common data entities 601*a* and 601*b* both labeled "F". MRDS entities and common data entities are designed and/or configured to support the formation of common entity relationships between multiple ERDs based upon a unique key shared by each set of MRDS entity copies and a unique key shared by this set of common data entities.

Common entity relationships, such as 620, 621, 622, 623 and 624, depict designed and/or configured data system access paths that will be data system instantiated between integrated data systems. These designed and/or configured data system access paths will be viable provided the data integrity is enforced among these integrated data systems. Common entity relationships indicate that a unique key in each set of MRDS entity copies and the unique key in each set of common data entities are each structurally identical. Each set of MRDS entity copies will be associated with their plurality of unique master reference data records that will be used in all integrated data systems to enforce data integrity between each set of MRDS table copies.

In accordance with at least on embodiment of the present invention, a method is provided, which can be called a "method of integrated ERD consolidation". This method may be used to consolidate multiple source integrated ERDs into a single target integrated ERD. The source integrated ERDs to be consolidated, in at least one embodiment, must be designed and/or configured specifically to support this form of integrated ERD consolidation. Since the target integrated ERD requires that its data entity names are unique and that within each data entity its attribute names are unique, the source integrated ERDs, in at least one embodiment, must share a common dictionary of data entities and of data attributes. When the source integrated ERDs are consolidated, the data entity names must be from a common set of data entity names that have been consistently applied when configuring the source integrated ERDs. In addition, within each data entity, each data attribute name, in at least one embodiment, must also be from a common set of data attributes. Within this common dictionary of data attributes, each attribute, in at least one embodiment, must also have a declared data type so that data type conflicts do not occur upon integrated ERD consolidation. Within each data entity of the dictionary, one or more unique keys, in at least one embodiment, must be defined so that upon consolidation, unique identifications for consolidated data entities are not in conflict. The source integrated ERDs to be consolidated may exist in one or more integrated data models provided that these integrated data model share a common dictionary of data entities and of data attributes. Since integrated ERD's also define a plurality of unique data records for each common data entity and for each MRDS entity, any integrated ERD to be consolidated needs to have the same plurality of unique data records defined for each common data entity copy and for each MRDS entity copy. Therefore, the plurality of unique data records associated with each common data entity and with each MRDS entity may also be a part of the dictionary of common data entities and of common data attributes and associated with each pertinent data entity copy.

Figure 7:
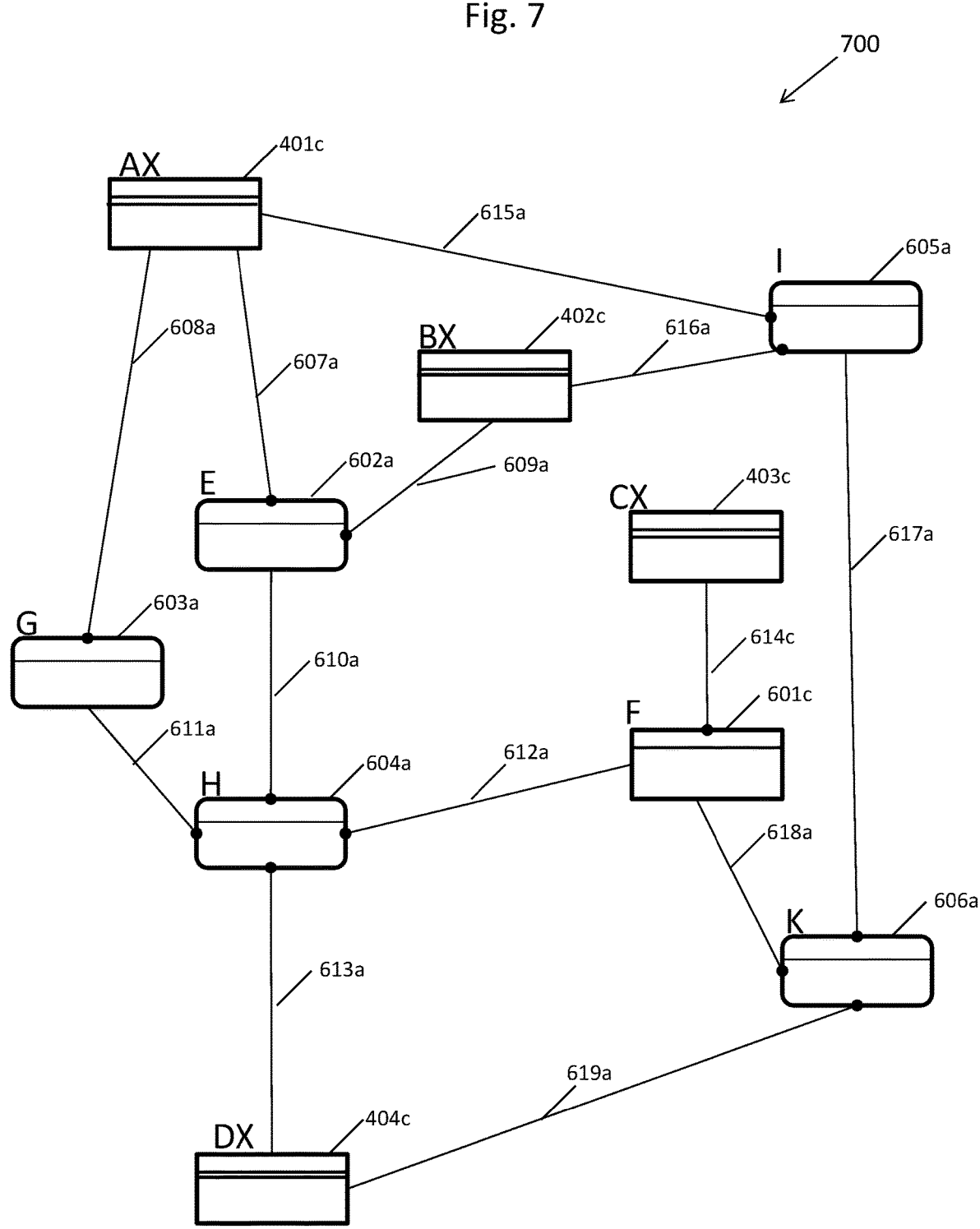
FIG. 7 depicts an integrated ERD that results from the non-transformative data consolidation of the two integrated ERDs depicted in FIG. 6, where the resultant consolidated integrated ERD may be displayed on a display device of the apparatus of FIG. 1 or stored in a computer memory of apparatus of FIG. 1.

FIG. 7 represents integrated ERD 700 which is a consolidation of the integrated ERDs from federated ERD 600 shown in FIG. 6. Integrated ERD 700 is comprised of MRDS entities 401c, 402c, 403c, and 404c, along with common data entity 601c, and data entities 602a, 603a, 604a, 605a, and 606a. Data entity relationships 607a, 608a, 609a, 610a, 611a, 612a, 613a, 614c, 615a, 616a, 617a, 618a, and 619a are also shown in integrated ERD 700.

MRDS entities 401c, 402c, 403c, and 404c of integrated ERD 700 are identical copies of MRDS entities 401, 402, 403, and 404 respectively shown in integrated ERD 400 of FIG. 4. First MRDS entity copy 401c of integrated ERD 700 was formed by consolidation of first MRDS entity copies 401a and 401b of federated ERD 600 shown in FIG. 6. Second MRDS entity copy 402c of integrated ERD 700 was formed by consolidation of second MRDS entity copies 402a and 402b of federated ERD 600 shown in FIG. 6. Third MRDS entity copy 403c of integrated ERD 700 was formed by consolidation of third MRDS entity copies 403a and 403b of federated ERD 600 shown in FIG. 6. Fourth MRDS entity copy 404c of integrated ERD 700 was formed by consolidation of fourth MRDS entity copies 404a and 404b of federated ERD 600 shown in FIG. 6.

Common data entity 601c of integrated ERD 700 is a consolidation of common data entities 601a and 601b federated ERD 600 shown in FIG. 6, where common data entity 601a is an identical copy of common entity 601b.

Data entities 602a, 603a, 604a, 605a, and 606a of integrated ERD 700 are copies of data entities 602, 603, 604, 605, and 606 respectively of federated ERD 600 shown in FIG. 6. When the integrated ERDs of federated ERD 600 are consolidated, these data entities are merely copied as they are unique within federated ERD 600 as opposed to being shared as in the case for the four sets of MRDS entity copies and the common data entities.

Data entity relationships 607a, 608a, 609a, 610a, 611a, 612a, 613a, 615a, 616a, 617a, 618a, and 619a of integrated ERD 700 are copies of 607, 608, 609, 610, 611, 612, 613, 615, 616, 617, 618, and 619 respectively of federated ERD 600 of FIG. 6. These data entity relationships are each unique within federated ERD 600 and as such only need to be copied to form integrated ERD 700 as shown in FIG. 7. Data entity relationship 614c of integrated ERD 700 is a consolidation of data entity relationships 614a and 614b for federated ERD 600 of FIG. 6. These two shared data entity relationships from federated ERD 600, in at least one embodiment, need to be consolidated since both reflect the same relationship between two sets of entities that are consolidated in integrated ERD 700 of FIG. 7.

Enterprise data models are a prior art form of data modeling methods where the scope of the data model is the entire enterprise's data. This enterprise data modeling method was popular in the 1990's. Enterprise data models were complex and therefore expensive to develop. When multiple databases were data system instantiated from a single enterprise data model, these multiple databases were still isolated information silos because these enterprise data modeling methods did not address the database interoperability needed to integrate databases. While enterprise data models did provide some data structure commonality between data system instantiated databases, these enterprise data models did not address the use of common master reference data records for example. While enterprise data models were often used to data system instantiate multiple databases, these established data modeling methods were never engineered to form integrated data systems.

With integrated data modeling methods, there is no self-imposed scope such as an entire enterprise. An integrated data model may have a scope beyond the enterprise that includes portions of multiple enterprises and external data providers. For this reason, we do not use the term enterprise data model. In addition, a consolidation of multiple integrated ERDs or a federation of multiple integrated ERDs is now possible so that any integrated ERDs may now be combined either virtually, as in the federated form or physically, as in the consolidated form. It is also now possible to derive a single consolidated integrated ERD or a federated ERD that would be equivalent in scope to an enterprise data model. Of course a major difference is that integrated data models are engineered to data system instantiate multiple integrated data systems while enterprise data models are not.

Figure 8:
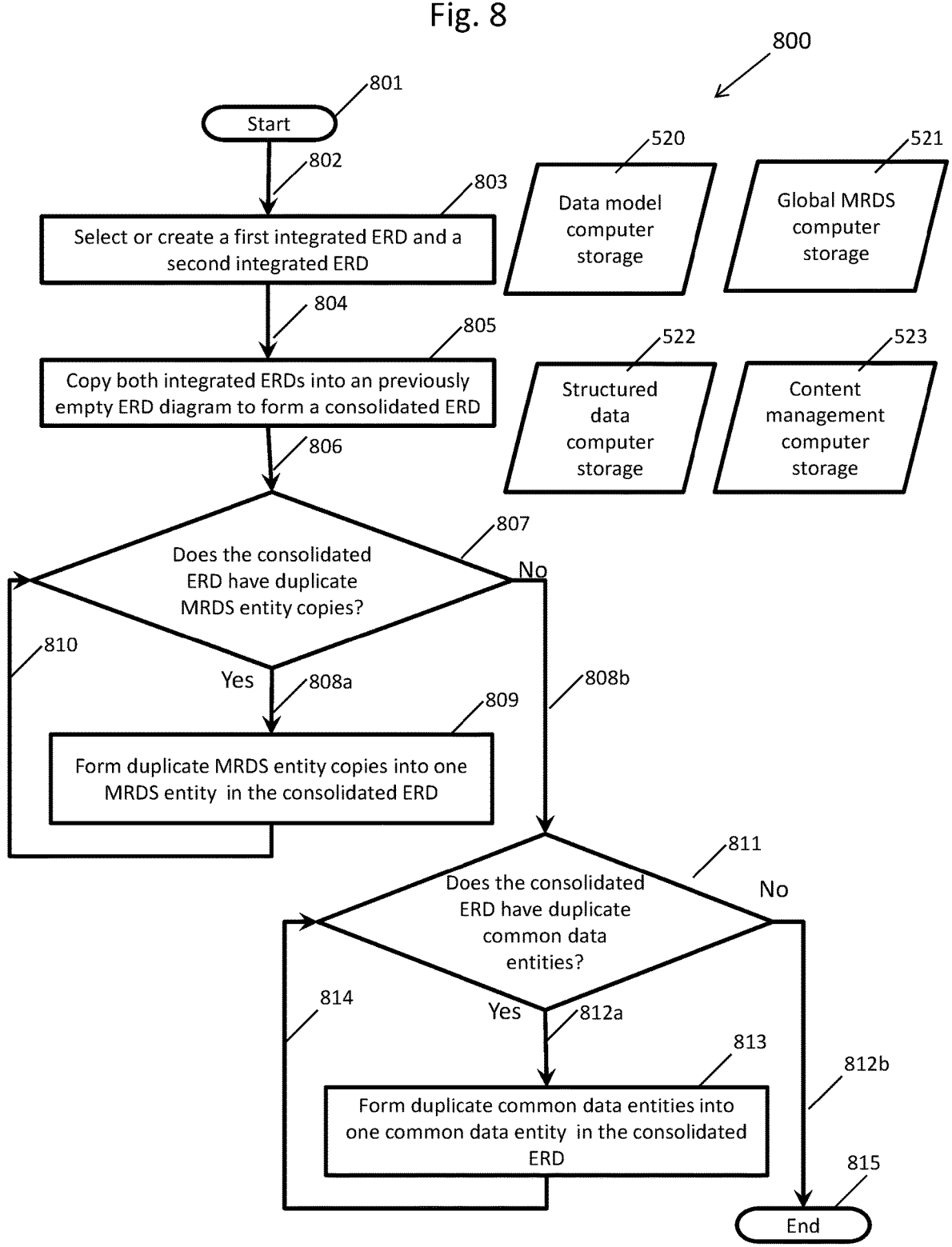
FIG. 8 depicts a flow chart for a method of consolidating two integrated ERDs, such as the two integrated ERDs of FIG. 6, to form a consolidated integrated ERD, such as the integrated ERD shown in FIG. 7, where the method may be executed on a computer processor of the apparatus of FIG. 1 with computer user interaction on an interactive device of the apparatus of FIG. 1. The consolidated integrated ERD may be displayed on a display device, such as a display device of apparatus of FIG. 1, or may be stored in computer memory, such as a computer memory of the apparatus of FIG. 1.

FIG. 8 is a depiction of flow chart 800 that represents a method used to consolidate two integrated ERDs into a single integrated ERD, such as integrated ERD 700 shown in FIG. 7 was consolidated from the two integrated ERDs 600a and 600b of federated ERD 600 shown in FIG. 6. Flow chart 800 of FIG. 8 is comprised of flow chart initiator 801, flow chart processes 803, 805, 809, and 813, along with flow chart decisions 807 and 811, as well as flow chart flows 802, 804, 806, 808a, 808b, 810, 812a, 812b, and 814, along with flow chart terminator 815. Flow chart 800 also uses computer storage areas 520, 521, 522, and 523 where these computer storage areas are the same computer storage areas depicted in flow chart 500 shown in FIG. 5. These computer storage areas provide a process to dynamically combine data management methods such as the methods depicted in flow charts 500, 800, 900, 1300, and 1400 shown in FIGS. 5, 8, 9, 13, and 14 respectively.

The method of flow chart 800, in at least one embodiment is programed to execute on computer processor 4 with computer user interaction using interactive device 2 and using computer storage areas in computer memory 8 of apparatus 100 that is depicted in FIG. 1.

Flow chart 800, shown in FIG. 8, begins at flow chart initiator 801 with computer processor 4 executing software stored in computer memory 8. Under computer control, flow chart flow 802 is followed to flow chart process 803. Within flow chart process 803, a computer user creates a new integrated ERD or selects, from a list of available integrated ERDs displayed on computer display device 6, the integrated ERD to be accessed from computer storage area 520 to be a first source integrated ERD. The computer user then creates a new integrated ERD or selects from the same list of available ERDs, an integrated ERD as the second source integrated ERD. The two source integrated ERDs, such as the integrated ERDs 600a and 600b of federated ERD 600 of FIG. 6, may be displayed on computer display device 6 as a federated ERD. Once the two source integrated ERDs have been configured, flow chart process 803 is complete and flow chart flow 804 is followed to flow chart process 805.

In flow chart process 805 of flow chart 800 shown in FIG. 8, the two source integrated ERDs from flow chart process 803 are copied by computer processor 4 into a previously empty ERD. The new integrated ERD may be in the same integrated data model as the one of the source integrated ERDs or may be an entirely different integrated data model. Once the two source integrated ERDs have been copied, flow chart control is passed to flow chart flow 806 which is followed to flow chart decision 807.

In flow chart decision 807, computer processor 4 is programmed to locate duplicate MRDS entities in the source integrated ERDs to be consolidated. When a duplicate MRDS entity is located, flow chart flow 808a is followed to flow chart process 809. Once no duplicate MRDS entities are found, flow chart flow 808b is followed to flow chart decision 811.

In flow chart process 809 of flow chart 800 shown in FIG. 8, computer processor 4 is programmed to remove one of the duplicate set of MRDS entities while moving the data entity relationships attached to the removed MRDS entity to the remaining MRDS entity of the set of MRDS entities. For example, MRDS entities 401a and 401b shown in federated ERD 600 of FIG. 6 represent a set of duplicate MRDS entities. If computer processor 4 removes MRDS entity 401b of federated ERD in FIG. 6, data entity relationship 615 which was attached to MRDS entity 401b must now instead be attached to MRDS entity 401a. The result is shown in integrated ERD 700 as MRDS entity 401c data entity 605a and as data entity relationship 615a. In the example of the two integrated ERDs of FIG. 6, duplicate MRDS 401b, 402b, 403b, and 404b will be removed under program control of computer processor 6 of apparatus 100 shown in FIG. 1. As the duplicate MRDS entities are removed, the common entity relationships will also be removed, such as common entity relationships 620, 621, 622, and 624 of federated ERD 600 shown in FIG. 6. Data entity relationship 615 will be detached from MRDS entity 401b and reattached to MRDS 401a, data entity relationship 616 will be detached from MRDS entity 402b and reattached to MRDS entity 402a, data entity relationship 614b will be detached from MRDS entity 403b and reattached to MRDS entity 403a, and data entity relationship 619 will be detached from MRDS entity 404b and reattached to MRDS entity 404a. Each modification of the integrated ERD is stored in computer storage area 520.

Once all of the duplicate MRDS entities have been removed from the integrated ERDs, flow chart flow 808b is followed to flow chart decision 811. If the computer processor finds duplicate common data entities in the integrated ERDs, flow control is transferred to flow chart flow 812a which is followed to flow chart process 813. If the computer processor does not find duplicate common data entities, the integrated ERD is stored in computer storage area 520, and updates to database structures and to data content management structures may then be made in computer storage areas 522 and 523 before flow control is transferred to flow chart flow 812b which is followed to flow chart terminator 815.

In flow chart process 813 of flow chart 800 shown in FIG. 8, computer processor 4 is programmed to remove one of the duplicate set of common data entities while moving the data entity relationships attached to the removed common data entity to the remaining common data entity. For example, common data entity 601a and 601b, shown in federated ERD 600 of FIG. 6, represent a set of duplicate common data entities. If computer processor 4 removes common data entity 601b of federated ERD 600, data entity relationship 614b which was attached to common data entity 601b must instead be attached to common data entity 601a of federated ERD 600. When the duplicate common data entity is removed, the common entity relationship, such as common entity relationship 623 of federated ERD 600, will also be removed. Once the duplicate common data entity has been removed and all displaced data entity relationships attached to the remaining common data entity, computer storage area 520 is updated with the changes. Once flow chart process 813 of flow chart 800 is complete, process control is passed back to flow chart decision 811 as depicted by flow chart flow 814. Again, once all duplicate common data entities have been removed as determined at flow chart decision 811, the method is terminated at flow chart terminator 815 as depicted in flow chart 800 of FIG. 8.

The process of consolidating integrated ERDs from federated ERDs is totally reversible. Therefore, in accordance with at least on embodiment of the present invention, a method is provided, which can be called a "method of splitting an integrated ERD". This method may be used to split a single integrated ERD into consolidated multiple integrated ERDs. For example, an integrated ERD, such as integrated ERD 700 of FIG. 7, may also be split into two or more integrated ERDs, such as integrated ERDs 600a and 600b of federated ERD 600 of FIG. 6, using methods such as that depicted in flow chart 900 shown in FIG. 9.

Flow chart 900 contains flow chart initiator 901, flow chart processes 903, 905, 907, 909, 911, and 913, as well as flow chart flows 902, 904, 906, 908, 910, 912, and 914, with flow chart terminator 915 and computer storage areas 520, 521, 522, and 523. Computer storage areas 520, 521, 522, and 523 are the same computer storage areas as found in flow charts 500 and 800 which are depicted in FIG. 5 and FIG. 8, respectively. These computer storage areas 520, 521, 522, and 523 provide a means to combine data modeling methods and database implementation methods to form and to maintain integrated ERDs, integrated data models, integrated databases, and integrated CMSs.

Flow chart 900 begins at flow chart initiator 901 where process control is passed to flow chart process 903 as indicated by flow chart flow 902. In flow chart process 903 of flow chart 900, the computer user is presented with a list of integrated ERDs on display device 6 retrieved from computer storage area 520 of computer memory 8 under the control of computer processor 4 of apparatus 100 shown in FIG. 1. The computer user selects the integrated ERD to be split into two integrated ERDs using interactive device 2 of apparatus 100 shown in FIG. 1. The selected integrated ERD, such as integrated ERD 700 shown in FIG. 7, is associated with a first integrated data model. Once the computer user has selected the integrated ERD to split into two integrated ERDs, flow chart process 903 is complete and program control is passed to flow chart process 905 as indicated by flow chart flow 904.

Figure 9:
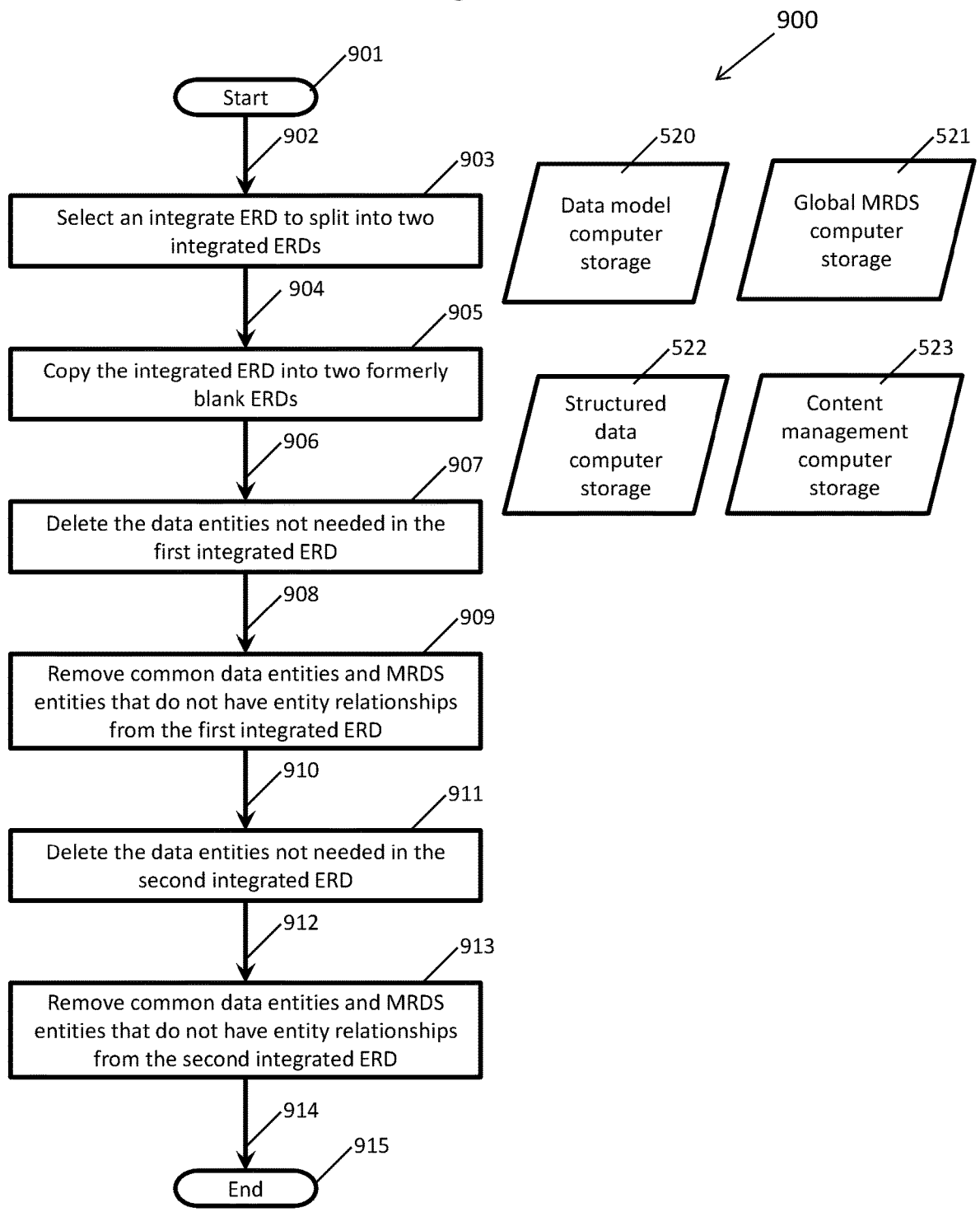
FIG. 9 depicts a flow chart for a method of splitting an integrated ERD, such as the integrated ERD in FIG. 7, into two integrated ERDs, such as the two integrated ERDs shown in a federated ERD in FIG. 6, where the method may be executed on the computer processor of the apparatus of FIG. 1 with computer user interaction on an interactive device of the apparatus of FIG. 1. The federated ERD may be displayed on a display device, such as the display device of the apparatus of FIG. 1, or may be stored in computer memory, such as a computer memory of the apparatus of FIG. 1.

In flow chart process 905 of flow chart 900 shown in FIG. 9, the integrated ERD, selected in flow chart process 903, is copied into two previously blank integrated ERDs and these two copied integrated ERDs are stored into computer storage area 520. The two copied integrated ERDs may be associated with the first integrated data model that is already associated with the selected integrated ERD, or they may be stored in one or two other integrated data models. With any option, the integrated ERDs will remain integrated because the MRDS entities and the common data entities form the bases of compatibility across integrated ERDs and across integrated data models. Once the integrated ERD copies have been made and stored in computer storage area 520, flow chart process 905 is complete and process control is passed to flow chart process 907 as indicated by flow chart flow 906.

In flow chart process 907 of flow chart 900 shown in FIG. 9, the computer user uses the integrated data modeling software to review the first copied integrated ERD being displayed on display device 6 of apparatus 100 shown in FIG. 1. Using the integrated data modeling software, the computer user deletes selected data entities from the first copied integrated ERD. When a data entity is deleted from an ERD, any data entity relationships that are attached to that deleted data entity are also deleted by computer processor 4 of apparatus 100 shown in FIG. 1. For example, the computer user may be presented with integrated ERD 700 as shown in FIG. 7. If the computer user selects to delete data entity 605a, computer processor 4 will also delete data entity relationships 615a, 616a, and 617a. If the computer user then decides to delete data entity 606a, computer processor 4 will also delete data entity relationships 618a and 619a having had data entity relationship 617a already being deleted with data entity 605a. By deleting data entities 605a and 606a from integrated ERD 700 shown in FIG. 7, the integrated ERD results that is formed by MRDS entities 401a, 402a, 403a, and 404a, along with common data entity 601a and data entities 602, 603, and 604 shown in federated ERD 600 of FIG. 6. Once the computer user deletes the selected data entities, the updated integrated ERD is stored in computer data storage area 520 which is a section of computer memory 8 of apparatus 100 shown in FIG. 1. Once the computer user is finished deleting data entities, flow chart process 907 is complete and process control is passed to flow chart process 909 as indicated by flow chart flow 908.

In flow chart process 909 of flow chart 900 shown in FIG. 9, computer processor 4 of apparatus 100 shown in FIG. 1 executing integrated data modeling software will delete any common data entities in the first updated integrated ERD that do not have at least one associated data entity relationship to any existing data entity. Computer processor 4 of apparatus 100 will also delete any data entity relationships associated with the deleted common data entity which in this case would be between a common data entity and itself (recursive), or a second common data entity or an MRDS entity. For example, common data entity 601c of integrated ERD 700 would not be deleted, in at least one embodiment, because data entity relationships 618a and 612a exist between common data entity 601c and data entities 606a and 604a respectively. If, however, data entity relationships 618a and 612a had been deleted previously, then common data entity 601c, in at least one embodiment, would be deleted by computer processor 4 of apparatus 100. Along with the deletion of common data entity 601c, computer processor 4 of apparatus 100 would also delete data entity relation 614c. Once the common data entities have been removed from the integrated ERD, any MRDS entity that is not related to a data entity or to a common data entity or to another MRDS entity will also be deleted by computer processor 4 of apparatus 100. In integrated ERD 700, once common data entity 601c has been deleted along with data entity relationship 614c, computer processor 4 would also delete MRDS entity 403c since MRDS entity 403c would not have data entity relationships with a data entity or with a common data entity or with another MRDS entity. Once the computer is finished deleting common data entities and MRDS entities, flow chart process 909 is complete and process control is passed to flow chart process 911 as indicated by flow chart flow 910.

In flow chart process 911 of flow chart 900 shown in FIG. 9, the computer user uses the integrated data modeling software to review the second copied integrated ERD being displayed on display device 6 of apparatus 100 shown in FIG. 1. Using the integrated data modeling software, the computer user deletes data entities from the second copied integrated ERD. When a data entity is deleted from an integrated ERD, any data entity relationships that are attached to that deleted data entity are also deleted by computer processor 4 of apparatus 100 shown in FIG. 1. For example, the computer user may be presented with integrated ERD 700 as shown in FIG. 7. If the computer user selects to delete data entity 604a from the second copied integrated ERD, computer processor 4 will also delete data entity relationships 610a, 611a, 612a, and 613a. If the computer user next deletes data entity 603a from the second copied integrated ERD, computer processor 4 will also delete data entity 608a. If the computer user selected to next delete data entity 602a from the second copied integrated ERD, computer processor 4 will delete data entity relationships 607a and 609a. The integrated ERD that remains after these user selected deletes is comprised of MRDS entities 401b, 402b, 403b, and 404b, along with common data entity 601b and data entities 605 and 606 show in federated ERD 600 in FIG. 6. Once the computer user and computer processor completes the deletions, the updated integrated ERD is stored in computer data storage area 520 which is a section of computer memory 8 of apparatus 100 shown in FIG. 1. Once the updated integrated ERD has been stored in computer memory, flow chart process 911 is complete and process control is transferred to flow chart process 913 as indicated by flow chart flow 912.

In flow chart process 913 of flow chart 900 shown in FIG. 9, computer processor 4 of apparatus 100 shown in FIG. 1 executing integrated data modeling software will delete any common data entities in the second updated integrated ERD that does not have at least one associated data entity relationship to any existing data entity. Computer processor 4 of apparatus 100 will also delete any data entity relationships associated with the deleted common data entity which in this case would be between a common data entity and itself (recursive), or a second common data entity or an MRDS entity. Along with the deletion of a common data entity, computer processor 4 of apparatus 100 would also delete any attached data entity relationships. Once the common data entities have been removed from the integrated ERD, any MRDS entity that is not related to a data entity or to a common data entity or to another MRDS entity will also be deleted by computer processor 4 of apparatus 100. Once the appropriate common data entities and MRDS entities have been deleted along with the appropriate data entity relationships, the second updated integrated ERD is stored in computer storage area 520. Then, process control is passed to flow chart flow 914 which leads to flow chart terminator 915 which ends the "method of splitting an integrated ERD" as depicted in flow chart 900 of FIG. 9.

In accordance with at least on embodiment of the present invention, a method is provided, which can be called a "method of data federation with integrated data systems". Integrated data systems, because of their data integrity enforcement between integrated data systems, provide data system access paths that were not provided with prior art data systems. Any group of integrated data systems may now be reliably data federated provided they comply with standardized data integration and they share at least one common MRDS compliant data structure where these common MRDS compliant data structures are all populated from the same plurality of unique master reference data records.

Figure 10:
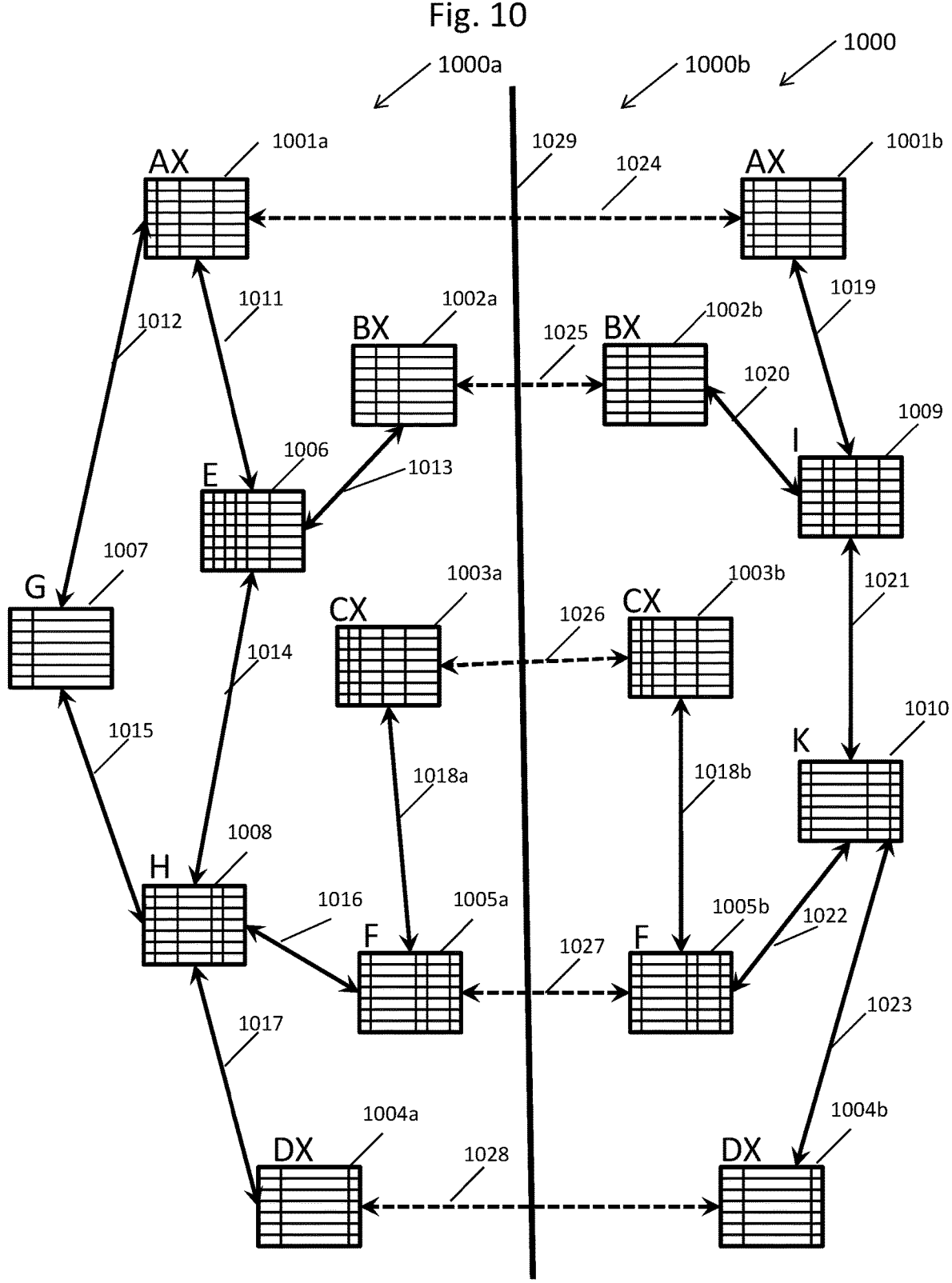
FIG. 10 depicts two integrated databases that were data system instantiated from the two integrated ERDs shown in FIG. 6, where the integrated databases share five data system access paths between them and where the integrated databases may be stored in a computer memory of the apparatus shown in FIG. 1.

FIG. 10 is a depiction of two integrated databases, both populated with data values, where the two integrated databases are joined by multiple common data system access paths. The first integrated database, integrated database 1000a, is comprised of MRDS tables 1001a, 1002a, 1003a, and 1004a, along with common database table 1005a and database tables 1006, 1007, and 1008 with foreign key constraints 1011, 1012, 1013, 1014, 1015, 1016, 1017, and 1018a. The second integrated database, integrated database 1000b, is comprised of MRDS tables 1001b, 1002b, 1003b, and 1004b, along with common database table 1005b and database tables 1009, and 1010 with foreign key constraints 1018b, 1019, 1020, 1021, 1022, and 1023. The boundary between first integrated database 1000a and second integrated database 1000b is demarcated by line 1029 in FIG. 10. MRDS tables 1001a and 1001b are compliant with the same first MRDS specification, MRDS tables 1002a and 1002b are compliant with the same second MRDS specification, MRDS tables 1003a and 1003b are compliant with the same third MRDS specification, and MRDS tables 1004a and 1004b are compliant with the same fourth MRDS specification. Each pair of compliant MRDS tables shares one or more common data system access paths between the first database and the second database. Common database tables 1005a and 1005b share a common unique index and were populated with data values from a common source of data and, as such, share a data system access path between the first database and the second database.

First integrated database 1000a depicted in FIG. 10 is data system instantiated from first integrated ERD 600a of federated ERD 600 depicted in FIG. 6. MRDS tables 1001a, 1002a, 1003a, and 1004a of FIG. 10 are data system instantiated from MRDS entities 401a, 402a, 403a, and 404a respectively of federated ERD 600. Common database table 1005a of FIG. 10 is data system instantiated from common data entity 601a depicted in FIG. 6. Database tables 1006, 1007, and 1008 of the first integrated database depicted in FIG. 10 are data system instantiated from data entities 602, 603, and 604, respectively for the first integrated ERD of federated ERD 600. Foreign key constraints 1011, 1012, 1013, 1014, 1015, 1016, 1017, and 1018a of the first integrated database depicted in FIG. 10 are data system instantiated from data entity relationships 607, 608, 609, 610, 611, 612, 613, and 614a respectively of the first integrated ERD of federated ERD 600 shown in FIG. 6.

Second integrated database 1000b depicted in FIG. 10 is data system instantiated from second integrated ERD 600b of federated ERD 600 depicted in FIG. 6. MRDS tables 1001b, 1002b, 1003b, and 1004b of FIG. 10 are data system instantiated from MRDS entities 401b, 402b, 403b, and 404b respectively of federated ERD 600. Common database table 1005b of the second integrated database of FIG. 10 is data system instantiated from common data entity 601b of the second integrated ERD of federated ERD 600 depicted in FIG. 6. Database tables 1009, and 1010 of the second integrated database depicted in FIG. 10 are data system instantiated from data entities 605, and 606 respectively for the second integrated ERD of federated ERD 600. Foreign key constraints 1018b, 1019, 1020, 1021, 1022, and 1023 of the second integrated database depicted in FIG. 10 are data system instantiated from data entity relationships 614b, 615, 616, 617, 618, and 619 respectively of the second integrated ERD of federated ERD 600 shown in FIG. 6. Data system access paths 1024, 1025, 1026, 1027, and 1028 depicted in FIG. 10 are data system instantiated from common entity relationships 620, 621, 622, 623, and 624 respectively from federated ERD 600 shown in FIG. 6.

In accordance with at least one embodiment of the present invention, a method is provided, which can be called a "method of data system consolidation from integrated data systems". This method may be used to consolidate multiple integrated data systems that have been populated with data values into a single coherent integrated data system that is populated with all the data values consolidated from the source integrated data systems. The source integrated data systems, to be consolidated without data transformations, must be designed and/or configured specifically to support this form of data system consolidation and also must have their pluralities of unique master reference data records properly managed and maintained.

Figure 11:
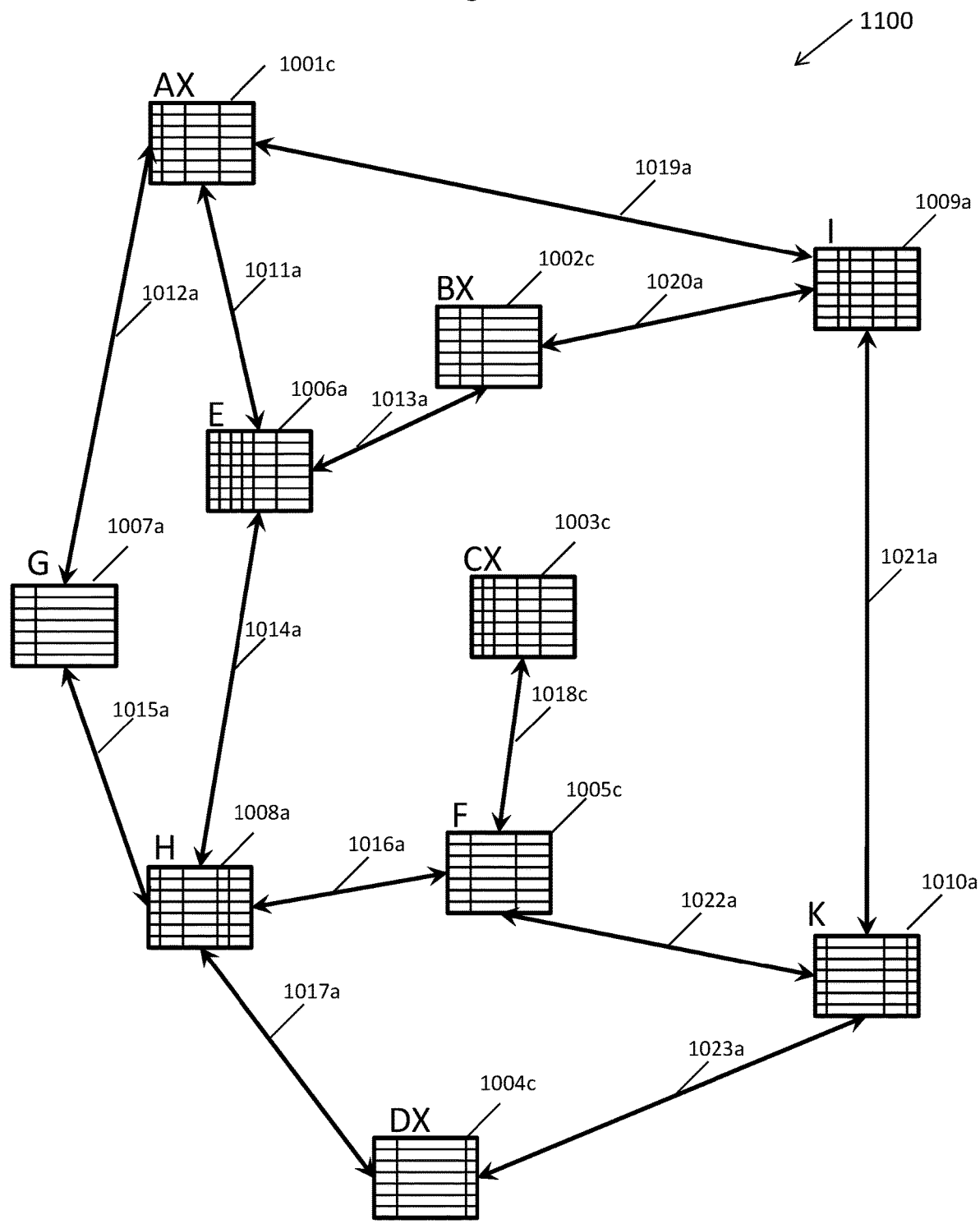
FIG. 11 depicts an integrated database that results from the consolidation of the two integrated databases depicted in FIG. 10, where the newly formed integrated consolidated database may be stored in a computer memory of the apparatus of FIG. 1.

FIG. 11 depicts integrated database 1100, which is populated with data values, that results when the two source integrated databases, such as integrated database 1000a and integrated database 1000b from FIG. 10 which were also populated with data values, are consolidated into a single integrated database. Database 1100, shown in FIG. 11, is comprised of MRDS tables 1001c, 1002c, 1003c, and 1004c, along with common database table 1005c, and database tables 1006a, 1007a, 1008a, 1009a and 1010a, as well as foreign key constraints 1011a, 1012a, 1013a, 1014a, 1015a, 1016a, 1017a, 1018c, 1019a, 1020a, 1021a, 1022a, and 1023a. MRDS tables 1001c of integrated database 1100 is compliant with the same first MRDS specification as are MRDS tables 1001a and 1001b of FIG. 10. MRDS tables 1002c of integrated database 1100 is compliant with the same second MRDS specification as are MRDS tables 1002a and 1002b of FIG. 10. MRDS tables 1003c of integrated database 1100 is compliant with the same third MRDS specification as are MRDS tables 1003a and 1003b of FIG. 10. MRDS tables 1004c of integrated database 1100 is compliant with the same fourth MRDS specification as are MRDS tables 1004a and 1004b of FIG. 10. Common database table 1005c of integrated database 1100 share a common unique index with common database tables 1005a and 1005b of FIG. 10 and as such share a data system access path, such as data system access path 1027 shown in FIG. 10, between the three integrated databases 1000a, 1000b, and 1100. Database table 1001c has the same structure as database tables 1001a & 1001b, but will have data records consolidated from both database tables 1001a & 1001b. Database table 1007 from FIG. 10 is the same as database table 1007a from FIG. 11 in both structure and in having the same data records; however these two database tables could be in different databases.

In the prior art, attempting to consolidate two or more databases into a single database without data transformations was not possible for a variety of reasons. When prior art databases were designed and/or configured, not all of data integration criteria needed for the formation of integrated databases were addressed. For example, common database tables and MRDS tables were not designated and pluralities of unique master reference data records were not designated, and interoperability between databases was not designed and/or configured into prior art database tables.

FIG. 12 represents a detailed view 1200 of MRDS tables 1001a, 1001b, and 1001c. MRDS table 1001a label is "Y.AX", which indicates that this MRDS table named "AX" is found in the integrated database named "Y" that is the same database table as MRDS table 1001a of integrated database 1000a shown in FIG. 10. MRDS table 1001a would be considered a first copy of a first MRDS table.

MRDS table 1001*b* label is "Z.AX", which indicates that this MRDS table named "AX" is found in the integrated database named "Z" that is the same database table as MRDS table 1001*b* of integrated database 1000*b* shown in FIG. 10. MRDS table 1001*b* would be considered a second copy of a first MRDS table. MRDS table 1001*c* label is "YZ.AX" which indicates that this MRDS table named "AX" is found in the integrated database named "YZ" that is the same database table as MRDS table 1001*c* of integrated database 1100 shown in FIG. 11. In FIG. 12, MRDS table 1001*c* of integrated database 1100 is formed from the consolidation of MRDS tables 1001*a* and 1001*b* of integrated databases 1000*a* and 1000*b* respectively. MRDS table 1001*c* would be considered a third copy of a first MRDS table.

All three MRDS tables depicted in FIG. 12 have the exact same structural composition, unless otherwise noted. For example, all three MRDS tables contain the identical five database table columns. MRDS table 1001*a* contains database table columns 1204*a*, 1205*a*, 1206*a*, 1207*a*, and 1208*a*, while MRDS table 1001*b* contains MRDS table columns 1204*b*, 1205*b*, 1206*b*, 1207*b*, and 1208*b*, while MRDS table 1001*c* contains MRDS table columns 1204*c*, 1205*c*, 1206*c*, 1207*c* and 1208*c*. All three MRDS table columns have common column names and data types. For example, the first database table columns 1204*a*, 1204*b*, and 1204*c* of MDRS tables 1001*a*, 1001*b*, and 1000*c* respectively are all named "AX_ID" and all are of data type INTEGER. The second database table columns 1205*a*, 1205*b*, and 1205*c* of MDRS tables 1001*a*, 1001*b*, and 1000*c* respectively are all named "AX Code" and all are of data type CHAR(5) indicating that all data values of those database table columns must be a character string of up to 5 characters in length.

All three MRDS tables 1001*a*, 1001*b*, and 1001*c* depicted in FIG. 12 contain an identical primary key constraint, contain an identical first alternate key constraint, and contain an identical second alternate key constraint. The first column, of each of these MRDS tables, database table columns 1204*a*, 1204*b*, and 1204*c*, have a "(PK)" designation indicating that this database table's column is declared as the primary key constraint of its respective MRDS table. The data values in each of these MRDS tables' primary key column must be unique within each database table.

For each of these MRDS tables in FIG. 12, the second database table column, database table columns 1205*a*, 1205*b*, and 1205*c*, all have a "(AK1)" designation. This "(AK1)" designation indicates that this database table's column is the first alternate key of its respective database table. The data values in each of these MRDS tables' second column, in at least one embodiment, must be unique within each database table because of the first alternate key constraint; however, the data values may be duplicated from one database table to another since each alternate key constraint is associated to a single database table.

For each of these MRDS tables in FIG. 12, the third database table column, which are database table columns 1206*a*, 1206*b*, and 1206*c*, all have a "(AK2.1)" designation. This "(AK2.1)" designation indicates that this database table's column is declared as the first column of the second alternate key constraint of its respective database table. The fourth database table column of each of these MRDS tables, that is database table columns 1207*a*, 1207*b*, and 1207*c*, have a "(AK2.2)" designation. The "(AK2.2)" designation indicates that this database table's column is declared as the second column of the second alternate key constraint of its respective database table. The combination of data value pairs from the third and fourth database table columns, that is the second alternate key constraint (a composite alternate key constraint), in at least one embodiment, must be unique within each database table; however, the data value pairs may be duplicated from one database table to another.

The fifth database table column of each of these MRDS tables, that is database table columns 1208*a*, 1208*b*, and 1208*c*, are labeled "AX_Description". There are no unique constraints declared upon this database table column.

All three MRDS tables 1001*a*, 1001*b*, and 1001*c* that are depicted in FIG. 12, are populated with data records such as data records 1211*a*, 1212*a*, 1213*a*, 1214*a*, and 1215*a* of MRDS table 1001*a*, as well as data records 1211*b*, 1214*b*, 1216*b*, 1217*b*, and 1218*b* of MRDS table 1001*b*, and as well as data records 1211*c*, 1212*c*, 1213*c*, 1214*c*, 1215*c*, 1216*c*, 1217*c*, and 1218*c* of MRDS table 1001*c*. The set of MRDS tables, which includes MRDS tables 1001*a*, 1001*b*, and 1001*c* depicted in FIG. 12, are all populated from a first plurality of unique master reference data records stored in computer memory at the first master data computer memory location as designated in the MRDS specification from which the plurality of MRDS tables are configured.

Please note that MRDS tables 1001*a* and 1001*b* both contain common unique master reference data records, such as data record 1211*a* of MRDS table 1001*a* and data record 1211*b* of MRDS table 1001*b*. Likewise, data record 1214*a* of MRDS table 1001*a* is identical to data record 1214*b* of MRDS table 1001*b* as depicted in FIG. 12. Since table 1001*c* is the consolidated MRDS table, that database table contains all of the unique master reference data records (1211-1218). The letters are indicative of the MRDS tables where a's are for the first copy of a first MRDS table 1001*a*, b's are for the second copy of a first MRDS table 1001*b*, and c's are for the third copy of a first MRDS table 1001*c*.

In FIG. 12, MRDS tables 1001*a* and 1001*b*, which are populated with data records from a single source plurality of unique master reference data records, are consolidated into MRDS table 1001*c*. Data record 1211*c* of MRDS table 1001*c* results for the consolidation of data records 1211*a* and 1211*b* of MRDS tables 1001*a* and 1001*b* respectively. Data records 1212*c* and 1213*c* of MRDS table 1001*c* results from data records 1212*a* and 1213*a* respectively of MRDS table 1001*a*. Data record 1214*c* of MRDS table 1001*c* results for the consolidation of data records 1214*a* and 1214*b* of MRDS tables 1001*a* and 1001*b* respectively. Data record 1215*c* of MRDS table 1001*c* results from data record 1215*a* of MRDS table 1001*a*. Data records 1216*c*, 1217*c*, and 1218*c* of MRDS table 1001*c* results from data records 1216*b*, 1217*b*, and 1218*b* respectively of MRDS table 1001*b*. Again, MRDS table 1001*c* may not contain duplicate master reference data records because of the unique indexes defined to enforce the uniqueness of the plurality of data records stored in that MRDS table.

Since MRDS tables 1001*a* and 1001*b* and 1001*c* are a copy of the same MRDS table, all three databases, that is database "Y", database "Z", and database "YZ" are integrated databases that share data system access paths. A data system access path is defined for each unique index of the MRDS table or MRDS files provided these MRDS tables and MRDS files are populated from the same plurality of unique master reference data records. In this example, MRDS tables 1001*a*, 1001*b*, and 1001*c* all contain three different unique indexes; the primary index (AX_ID(PK)), the first alternate index (AX_Code(AK1)), and alternate composite index (AX_Name(AK2.1) and AX_Date (AK2.2)). Therefore, these MRDS tables share three data system access paths. Any of the three data system access paths may be used to directly join data records among these MRDS tables.

Since all three MRDS tables 1001a, 1001b, and 1001c contain the common unique master reference data record 1211a, 1211b, and 1211c, these master reference data records form a direct join for that unique master reference data record between the three MRDS tables in these three integrated databases. However, in the case of unique master reference data record 1212a and 1212c, which are identical master reference data records, only MRDS tables 1001a and 1001c may participate in a direct join since MRDS table 1001b does not contain a copy of that unique master reference data record.

FIG. 13 depicts flow chart 1300 for a method of consolidating two source integrated data systems, such as the two integrated databases 1000a and 1000b depicted in FIG. 10, into a single consolidated integrated data system, such as the integrated database 1100 depicted in FIG. 11. Before the data system consolidation, both source integrated databases are populated with data values such as MRDS tables 1001a and 1001b shown in FIG. 12. The consolidated integrated database is populated with the data values consolidated from the source integrated databases. For example, MRDS table 1001c shown in FIG. 12 is part of integrated database 1100 shown in FIG. 11, where MRDS table 1001c resulted from the consolidation of MRDS tables 1001a and 1001b of source integrated databases 1000a and 1000b respectively which are shown in FIG. 10. As shown in FIG. 12, MRDS table 1001c is populated with data values consolidated from both source integrated databases.

The consolidation of two integrated data systems is the most complex form of standardized data integration since the data integration requirements are most stringent. In order to consolidate integrated databases, the database structures of the two source integrated databases must be compatible, with multiple MRDS tables or multiple common database tables or combinations of these types of database tables. With MRDS tables and common database tables, database structure commonality and master reference data record commonality is incorporated into each integrated database in such a method as to address the critical data integration factors needed to support data system consolidation.

Flow chart 1300, shown in FIG. 13, is comprised of flow chart initiator 1301, and of flow chart processes 1303, 1305, 1307, 1311, 1315 and 1317, and flow chart decisions 1309 and 1313, along with flow chart flows 1302, 1304, 1306, 1308, 1310a, 1310b, 1312, 1314a, 1314b, 1316, and 1318, along with flow chart terminator 1319. The flow chart uses computer storage areas 520, 521, 522, 523, which is the same data storage area as the four computer storage areas depicted in flow charts 500, 800, and 900 of FIG. 5, FIG. 8 and FIG. 9 respectively. These computer storage areas provide a means to combine methods used to configure, data system instantiate, and maintain integrated ERDs, integrated data models, integrated data systems, and integrated CMSs.

Flow chart 1300 begins at flow chart initiator 1301 under program control with computer processor 4 executing software stored in computer memory 8 of apparatus 100 depicted in FIG. 1. Under computer control, flow chart flow 1302 is followed to flow chart process 1303 where the computer user selects two integrated data systems, referred to as two source integrated data systems, to be consolidated into a single integrated data system. The computer user may select both source integrated data systems using a list of existing source integrated data systems retrieved by a computer processor, such as computer processor 4 of apparatus 100 depicted in FIG. 1, from computer data storage area 522 and computer storage area 523 where these computer storage areas exist in computer memory such as computer memory 8 of apparatus 100. Once the source integrated data systems have been identified, flow chart process 1303 is complete and computer process control is passed to flow chart process 1305 as depicted by flow chart flow 1304 of flow chart 1300.

In flow chart process 1305 of flow chart 1300, a computer processor is programed to consolidate the two source integrated data systems by first consolidating there associated integrated ERDs. If an up to date integrated ERDs are not available for the source integrated data systems, the integrated data modeling software should be used to reverse-engineer the two integrated ERDs from the two source integrated data systems. For example, integrated databases 1001a and 1001b depicted in FIG. 10 could both be reverse-engineered resulting in the two integrated ERDs, integrated ERDs 600a and 600b of federated ERD 600 depicted in FIG. 6. Once the two integrated ERDs are stored in computer storage area 521, they may be consolidated into a single integrated ERD, such as integrated ERD 700, using the integrated ERD consolidation method depicted in flow chart 800 shown in FIG. 8. Once the consolidated integrated ERD, such as integrated ERD 700 of FIG. 7, has been completed by computer processor 4 and stored in computer storage area 521, which is a portion of computer memory 8 of apparatus 100 shown in FIG. 1, flow chart process 1305 has been completed. Computer processor control will pass to flow chart process 1307 as indicated by flow chart flow 1306.

In flow chart process 1307 of flow chart 1300, the consolidated integrated ERD will be data system instantiated to form the consolidated integrated data system. For example, consolidated integrated ERD 700 depicted in FIG. 7, may be data system instantiated using the integrated data modeling software executing on computer processor 4 of apparatus 100 depicted in FIG. 1, to form integrated database 1100 depicted in FIG. 11. Once the integrated data system, which supports consolidation of the two selected integrated data systems, has been data system instantiated, flow chart process 1307 is complete. Computer processor control is then passed to flow chart decision 1309 as indicated by flow chart flow 1308.

Now that the consolidated data system structures have been completely data system instantiated, the actual data values from the two source integrated data systems may now be stored in this consolidated data system. In flow chart decision 1309 of flow chart 1300, computer processor 4 of apparatus 100 is programed to determine if the two source integrated data systems contain a shared MRDS table or MRDS file. If a shared MRDS table or MRDS file has been found that has not yet been processed, program control is passed to flow chart process 1311 as indicated by flow chart flow 1310a, while if all shared MRDS tables and MRDS files have been processed, program control is passed to flow chart decision 1313 as indicated by flow chart flow 1310b.

In flow chart process 1311 of flow chart 1300 shown in FIG. 13, the data values from both source integrated data systems shared MRDS tables are used to populate the MRDS table or MRDS file of the consolidated integrated data system. For example, data values from source MRDS table 1001a and data values from source MRDS table 1001b are used to populate consolidated MRDS table 1001c as depicted in FIG. 12. The unique database indexes of the MRDS tables will insure that no duplicate data records are stored in any MRDS table. For example, when MRDS table 1001a and MRDS table 1001b are consolidated, the result would be MRDS table 1001*c* shown in FIG. 12 where duplicate data records are not possible because of the primary key constraint placed upon MRDS table column 1001*c*. Once the consolidated MRDS table has been populated with data values, flow chart process 1311 is complete. Program control is passed back to flow chart decision 1309 as indicated by flow chart flow 1312.

Once all the shared MRDS tables and MRDS files from the two source integrated data systems have been processed, program control is passed to flow chart decision 1313 as indicated by flow chart flow 1310*b*. In flow chart decision 1313 of flow chart 1300, a computer processor, such as computer processor 4 of apparatus 100 depicted in FIG. 1, is programmed to determine if the two source integrated data systems contain a shared common database table. If a shared common database table has been found that has not yet been processed, program control is passed to flow chart process 1315 as indicated by flow chart flow 1314*a*. If all shared common database tables have been processed, program control is passed to flow chart process 1317 as indicated by flow chart flow 1314*b*.

In flow chart process 1315 of flow chart 1300 shown in FIG. 13, the data values from both source integrated data system's shared common database tables or common data system data files are used to populate the common database table or common data system data file of the consolidated integrated data system. For example, data values from source common database table 1005*a* and data values from source common database table 1005*b*, both depicted in FIG. 10, are used to populate consolidated common database table 1005*c* as depicted in consolidated integrated database 1100 shown in FIG. 11. The unique database indexes of common database table 1005*c* will insure that no duplicate data records are stored in this common database table. What results is a union of the source common database table data records in the consolidated common database table. Once the consolidated database table has been populated with data values, flow chart process 1315 is complete. Program control is passed back to flow chart decision 1313 as indicated by flow chart flow 1316 of flow chart 1300 shown in FIG. 13.

In flow chart process 1317 of flowchart 1300, the data values for the remainder of the consolidated integrated database tables and integrated data system data files are copied from the two source integrated data systems' database tables and integrated data system data files. For example, to completely populate consolidated integrated database 1100 depicted in FIG. 11, database tables 1006*a*, 1007*a*, 1008*a*, 1009*a* and 1010*a* need to be populated with data values. All data records from database table 1006 shown in FIG. 10 are copied into database table 1006*a* shown in consolidated integrated database 1100 shown in FIG. 11. All data records from database table 1007 shown in FIG. 10 are copied into database table 1007*a* shown in FIG. 11. All data records from database table 1008 shown in FIG. 10 are copied into database table 1008*a* shown in FIG. 11. Data records for database table 1008, in at least one embodiment, must be copied after database tables 1006 and 1007 because database table 1008 inherits a foreign key index from both database tables 1006 and 1007 as indicated by foreign key constraints 1014*a* and 1015*a* respectively. All data records from database table 1009 shown in FIG. 10 are copied into database table 1009*a* shown in FIG. 11. All data records from database table 1010 shown in FIG. 10 are copied into database table 1010*a* shown in FIG. 11. Data records for database table 1010, in at least one embodiment, must be copied after database table 1009 because database table 1010 inherits a foreign key index from database tables 1009 as indicated by foreign key constraints 1021*a*. Once all of the remaining database tables in the consolidated integrated data system have been populated with data, flow chart process 1317 is complete. Program control is then transferred to flow chart terminator 1319 as indicated by flow chart flow 1318 and the "method of data system consolidation from integrated data systems" has completed.

The process of consolidating integrated data systems from two or more integrated data systems is totally reversible. Therefore, an integrated data system, such as integrated data system 1100 of FIG. 11, may also be split into two or more integrated data systems, such as integrated data systems 1000*a* and 1000*b* of FIG. 10, using methods such as that depicted in flow chart 1400 shown in FIG. 14.

Figure 14:
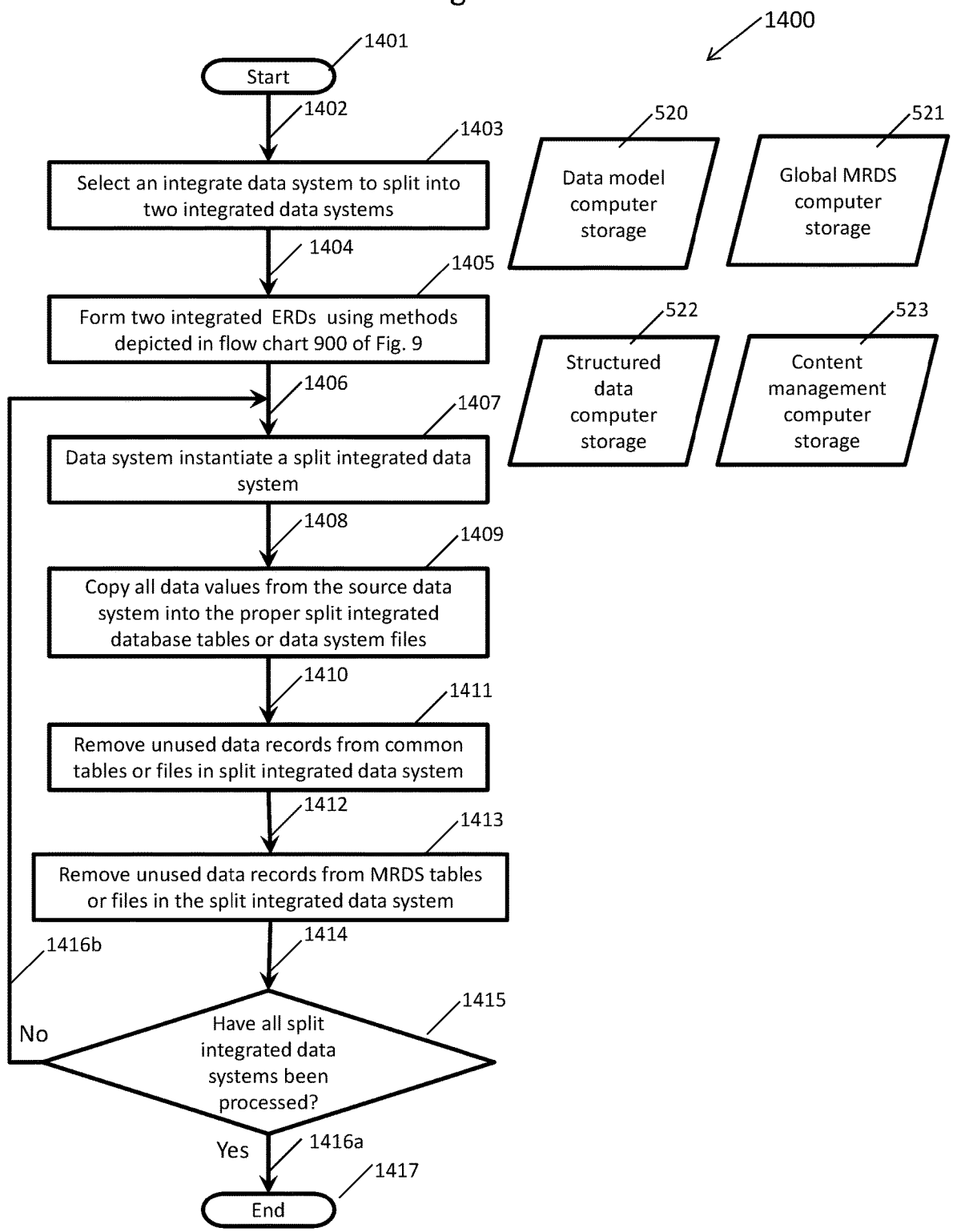
FIG. 14 depicts a flow chart of a method for splitting an integrated data system populated with data values, such as the integrated database depicted in FIG. 11, into two compatible integrated data systems populated with compatible data values, such as the two integrated databases depicted in FIG. 10, where the method may be executed on a computer processor of the apparatus of FIG. 1 with computer user interaction on an interactive device of the apparatus of FIG. 1.

Flow chart 1400 depicted in FIG. 14 is comprised of flow chart initiator 1401, and of flow chart processes 1403, 1405, 1407, 1409, 1411, 1411 and 1413, and flow chart decision 1415, along with flow chart flows 1402, 1404, 1406, 1408, 1410, 1412, 1414, 1416*a*, and 1416*b*, along with flow chart terminator 1417. The flow chart used computer storage areas 520, 521, 522, 523, which is the same data storage area as the four computer storage areas depicted in flow charts 500, 800, 900, and 1300 of FIG. 5, FIG. 8, FIG. 9 and FIG. 13 respectively. These computer storage areas provide a means to combine methods, to design and/or configure, to data system instantiate and to maintain integrated ERDs, integrated data models, integrated data systems, and integrated CMSs.

Flow chart 1400 shown in FIG. 14 begins at flow chart initiator 1401. Processor control is passed to flow chart process 1403 as indicated by flow chart flow 1402. In flow chart process 1403 of flow chart 1400, a computer processor, such as computer processor 4 of apparatus 100, is programmed to display on a computer display device, such as computer display device 6 of apparatus 100, a list of integrated data systems retrieved from computer storage areas 522 and 523. The computer user selects an integrated data system, such as integrated data system 1100 depicted in FIG. 11, to be split into two integrated data systems, such as integrated data systems 1000*a* and 1000*b* depicted in FIG. 11, from the list of integrated data systems being displayed. Once the computer user has selected the integrated data system to be split, flow chart process 1403 is complete and program control is passed to flow chart process 1405 as indicated by flow chart flow 1404.

In flow chart process 1405 of flow chart 1400, the computer user initiates the split integrated ERD method which is detailed in flow chart 900 shown in FIG. 9. If a current integrated data model or integrated ERD does not exist, the integrated data system to be split, such as integrate data system 1100 depicted in FIG. 11, may be reverse-engineered into an integrated data model and its associated integrated ERD, such as integrated ERD 700 depicted in FIG. 7. The reverse-engineered integrated ERD and its integrated data model is then stored in computer storage area 520. Using the "method of splitting an integrated ERD" depicted in flow chart 900 shown in FIG. 9, two integrated ERDs are designed and/or configured and stored in computer storage area 520. Once both integrated ERDs have been stored, flow chart process 1405 is complete and program control is passed to flow chart process 1407 as indicated by flow chart flow 1406.

In flow chart process 1407 of flow chart 1400, an integrated data system is data system instantiated from an integrated ERD of an integrated data model. The integrated ERD, such as integrated ERD 600*a* shown in FIG. 6, is retrieved from computer storage area 520 and data system instantiated to form the integrated data system, such as integrated database 1000*a* shown in FIG. 10. Once the integrated data system has been data system instantiated, flow chart process 1407 is complete and program control is passed to flow chart process 1409 as indicated by flow chart flow 1408.

In flow chart process 1409 of flow chart 1400, the data values are copied from the source integrated data system into the target integrated data systems. These data values, which are copied into the database tables or data system data files, must be achieved in the proper order so as not to violate any data system foreign key constraints. All the MRDS tables or MRDS files would be copied first followed by all the common database tables or common data systems data files and then by the database tables or data system data files where parent database tables or parent data system data files are populate with data values before the child database tables and child data system data files. For example, in integrated database 1000*a* depicted in FIG. 10, MRDS tables 1001*a*, 1002*a*, 1003*a*, and 1004*a* would be populated with data values first from MRDS tables 1001*c*, 1002*c*, 1003*c*, and 1004*c* respectively of integrated database 1100 shown in FIG. 11. Common database table 1005*a* would need to be populated with data values next as this common database table is dependent upon MRDS table 1003*a*. Common database table 1005*a* of database 1000*a* would be populated from common database table 1005*c* of integrated database 1100 depicted in FIG. 11. Database tables 1006 and 1007, of integrated database 1000*a* depicted in FIG. 10, would both be populated before database table 1008 as database table 1008 is dependent upon both database tables as is indicated by foreign key constraints 1014 and 1015. Database tables 1006, 1007 and 1008 of integrated database 1000*a* would be populated from database tables 1006*a*, 1007*a*, and 1008*a* of integrated database 1100 depicted in FIG. 11. Once all the database tables and data system data files are populated with data values, flow chart process 1409 is complete and program control is passed to flow chart process 1411 as indicated by flow chart flow 1410.

In flow chart process 1411 of flow chart 1400, common database table data records or common data system data files that are not needed are deleted from each common database table or from each common data system data file. For example, data records in common database table 1005*a* that are not associated with data records in database table 1008 need to be deleted from common database table 1005*a* in integrated database 1000*a* as depicted in FIG. 10. Once the unneeded data records have been deleted from all the common database tables or common data system data files, flow chart process 1411 is complete. Program control is then passed to flow chart flow 1413 as indicated by flow chart flow 1412.

In flow chart process 1413 of flow chart 1400, MRDS table or MRDS file data records that are not needed are deleted from each MRDS table or MRDS file. For example, in integrated database 1000*a* depicted in FIG. 10, data records in MRDS table 1001*a*, that are not associated with data records in database table 1006 as indicated by foreign key constraint 1011 or with data records in database table 1007 as indicated by foreign key constraint 1012, should be deleted from MRDS table 1001*a*. Once the independent data records from all MRDS tables and from all MRDS files have been deleted, flow chart process 1413 is completed. Program control is passed to flow chart decision 1415 as indicated by flow chart flow 1414 of flow chart 1400.

In flow chart decision 1415 of flow chart 1400 shown in FIG. 14, it is determined if all split integrated data systems have been processed. If more split integrated data systems need to be processed, program control is passed back to flow chart process 1407 as indicated by flow chart flows 1416*b* and 1406. If all split integrated databases have been processed, program control is passed to flow chart terminator 1417 as indicated by flow chart flow 1414.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. A method implemented by one or more computer processors programmed by computer software stored in one or more non-transitory computer-readable mediums comprising:

forming a first database in the one or more non-transitory computer-readable mediums, wherein the first database includes a plurality of database tables having a corresponding plurality of foreign key constraints;

forming a second database in the one or more non-transitory computer-readable mediums, wherein the second database includes a plurality of database tables having a corresponding plurality of foreign key constraints;

wherein a first data system access path links a first unique index of a first database table in the first database with a copy of the first unique index in a first database table in the second database;

wherein the first database table of the first database is populated with data records;

wherein the first database table of the second database is populated with data records;

wherein data integrity between the data records of the first database table of the first database and the data records of the first database table of the second database is enforced for the first data system access path;

the method further comprises performing a database consolidation by consolidating the first database and the second database into a third database;

wherein after database consolidation, the third database contains the first database and the second database;

the step of performing the database consolidation includes combining the first database table of the first database and the first database table of the second database as they existed prior to database consolidation to form a first consolidated database table in the third database with a copy of the first unique index in the first consolidated database table;

the step of performing the database consolidation includes data record consolidation, wherein the data records of the first database table of the first database and the data records of the first database table of the second database as they existed prior to database consolidation are data record consolidated into the first consolidated database table;

wherein the foreign key constraints of the first database that referenced the first database table of the first database before the first combining step, after the first combining step reference the first consolidated database table; and wherein the foreign key constraints of the second database that referenced the first database table of the second database before the first combining step, after the first combining step reference the first consolidated database table.

2. The method of claim 1
wherein a second data system access path links a second unique index of a second database table in the first database with a copy of the second unique index in a second database table in the second database;
wherein the method includes populating the second database table of the first database with data records;
wherein the method includes populating the second database table of the second database with data records;
wherein the method includes enforcing data integrity between the data records of the second database table of the first database and the data records of the second database table of the second database for the second data system access path;
the method further comprised of a second combining step which combines the second database table of the first database and the second database table of the second database to form a second consolidated database table in the third database with a copy of the second unique index;
wherein the data records of the second database table of the first database and the data records of the second database table of the second database as they existed prior to database consolidation are data record consolidated into the second consolidated database table;
wherein the foreign key constraints of the first database that referenced the second database table of the first database before the second combining step, after the second combining step reference the second consolidated database table; and
wherein the foreign key constraints of the second database that referenced the second database table of the second database before the second combining step, after the second combining step reference the second consolidated database table.

3. The method of claim 2
wherein a third data system access path links a third unique index of a third database table in the first database with a copy of the third unique index in a third database table in the second database;
wherein a fourth data system access path links a fourth unique index of a third database table in the first database with a copy of the fourth unique index in a third database table in the second database;
wherein the method includes populating the third database table of the first database with data records;
wherein the method includes populating the third database table of the second database with data records;
wherein the method includes enforcing data integrity between the data records of the third database table of the first database and the data records of the third database table of the second database for the third data system access path and the fourth data system access path;
the method further comprises a third combining step which combines the third database table of the first database and the third database table of the second database to form a third consolidated database table in the third database with a copy of the third unique index and a copy of the fourth unique index;
wherein the data records of the third database table of the first database and the data records of the third database table of the second database as they existed prior to database consolidation are data record consolidated into the third consolidated database table;
wherein the foreign key constraints of the first database that referenced the third database table of the first database before the third combining step, after the third combining step reference the third consolidated database table; and
wherein the foreign key constraints of the second database that referenced the third database table of the second database before the third combining step, after the third combining step reference the third consolidated database table.

4. The method of claim 1
wherein the first database table of the second database is a copy of the first database table of the first database; and
wherein the first consolidated database table is a copy of the first database table of the first database.

5. The method of claim 1
the step of performing data record consolidation further includes, after the first consolidated database table is formed, copying
the data records from the first database table of the first database into the first consolidated database table; and
copying the data records of the second database table of the second database into the first consolidated database table; and
wherein any data records in the first database table of the second database that are copies of any data records in the first database table of the first database are not copied into the first consolidated database table.

6. The method of claim 1 further comprising:
forming a fourth database in the one or more non-transitory computer-readable mediums, wherein the fourth database includes a plurality of database tables having a corresponding plurality of foreign key constraints;
the method further comprises performing a database consolidation by consolidating the fourth database into the third database;
wherein after database consolidation, the third database contains the first database, the second database, and the fourth database;
wherein the first data system access path links the first unique index of the first database table in the first database with a copy of the first unique index in a first database table in the fourth database;
wherein the first data system access path links the copy of the first unique index of the first database table in the second database with a copy of the first unique index in the first database table in the fourth database;
the method further comprises performing database consolidation by a second combining step which combines the first database table of the fourth database and the first consolidated database table;
wherein the foreign key constraints of the plurality of foreign key constraints of the fourth database that referenced the first database table of the third database before the second combining step, after the second combining step reference the first consolidated database table of the third database.

7. The method of claim 1
wherein the method includes enforcing data integrity for the first data system access path with a first plurality of unique data records stored in the one or more non-transitory computer-readable mediums;

wherein the method includes only allowing the first database table of the first database to be populated with data records from the first plurality of unique data records; and wherein the method includes only allowing the first database table of the second database to be populated with data records from the first plurality of unique data records.

8. The method of claim 1
the step of performing the database consolidation includes;
both deleting the first database table of the first database and deleting the first database table of the second database after both forming the first consolidated database table in the third database and data record consolidation.

9. A method implemented by one or more computer processors programmed by computer software stored in one or more non-transitory computer-readable mediums comprising:
forming a first database in the one or more non-transitory computer-readable mediums, wherein the first database includes a plurality of database tables having a corresponding plurality of foreign key constraints, wherein the database tables of the first database are populated with data records;
forming a first entity-relationship diagram in the one or more non-transitory computer-readable mediums that represents the first database, wherein the first entity-relationship diagram contains a plurality of data entities and a corresponding plurality of data entity relationships, wherein each data entity of the plurality of data entities represents a single database table of the first database, and wherein each data entity relationship of the plurality of data entity relationships represents a single foreign key constraint of the first database;
performing a database split by dividing the first database to form a second database and a third database, wherein after the database split, the second database and the third database are integrated databases, and wherein after the split, the second and third databases are linked by one or more data system access paths;
wherein performing the database split includes a step of forming a second entity-relationship diagram in the one or more non-transitory computer-readable mediums by making a copy of the first entity-relationship diagram and forming a third entity-relationship diagram in the one or more non-transitory computer-readable mediums by making a copy of the first entity-relationship diagram;
wherein performing the database split includes a step of modifying the second entity-relationship diagram to model the second database before the second database is data system instantiated and modifying the third entity-relationship diagram to model the third database before the third database is data system instantiated;
further comprising adding a plurality of common entity relationships to link the second entity-relationship diagram and the third entity-relationship diagram in the one or more non-transitory computer-readable mediums;
wherein performing the database split includes instantiating the second entity-relationship diagram into the second database and instantiating the third entity-relationship diagram into the third database;
wherein each common entity relationship is data system instantiated as a data system access path of the one or more data system access paths between the second database and the third database once data integrity has been established for each data system access path of the one or more data system access paths; and
wherein performing the database split includes populating the second database with data from the first database and populating the third database with data from the first database.

10. The method of claim 9
wherein the first, second, and third entity-relationship diagrams are contained within a first data model in the one or more non-transitory computer-readable mediums.

11. The method of claim 9
wherein the first and second entity-relationship diagrams are contained within a first data model in the one or more non-transitory computer-readable mediums; and
wherein the third entity-relationship diagram is contained within a second data model in the one or more non-transitory computer-readable mediums.

12. The method of claim 9
wherein the first, second, and third databases are managed by a first database management system software in the one or more non-transitory computer-readable mediums.

13. The method of claim 9
wherein the first and second databases are managed by a first database management system software in the one or more non-transitory computer-readable mediums; and
wherein the third database is managed by a second database management system software in the one or more non-transitory computer-readable mediums.

14. The method of claim 9
wherein the first entity-relationship diagram is formed by reverse-engineering the first database using data modeling software in the one or more non-transitory computer-readable mediums.

15. The method of claim 9
wherein modifying the second and third entity-relationship diagrams includes removal of a first set of one or more data entities and their associated data entity relationships from the second entity-relationship diagram and removal of a second set of one or more data entities and their associated data entity relationships from the third entity-relationship diagram;
wherein a data entity removed from the second entity-relationship diagram, its data entity copy would not be removed from the third entity-relationship diagram; and
wherein a data entity removed from the third entity-relationship diagram, its data entity copy would not be removed from the second entity-relationship diagram.

16. The method of claim 15 wherein
the second entity-relationship diagram includes a third set of one or more data entities;
wherein each data entity in the third set of one or more data entities is a parent data entity in one or more associated data entity relationships in the second entity-relationship diagram;
the third entity-relationship diagram includes a fourth set of one or more data entities;
wherein each data entity in the fourth set of one or more data entities is a parent data entity in one or more associated data entity relationships in the third entity-relationship diagram;

each data entity of the fourth set of one or more data entities is a corresponding copy of one of the data entities of the third set of one or more data entities, such that there are the same number of data entities in the third set of one or more data entities and in the fourth set of one or more data entities, there is a one to one correspondence between data entities of the third set of one or more data entities and data entities of the fourth set of one or more data entities, and each data entity of the third set of data entities has only one corresponding copy in the fourth set of data entities;

and wherein the method further comprises adding a common entity relationship in the one or more non-transitory computer-readable mediums relating each data entity of the third set of one or more data entities in the second entity-relationship diagram and its corresponding copy of the fourth set of one or more data entities in the third entity-relationship diagram.

17. The method of claim 9 further comprises populating a plurality of database tables of the second database after the second database has been instantiated;

wherein each database table of the plurality of database tables of the second database is populated with data records copied from its corresponding database table of the plurality of database tables of the first database;

populating a plurality of database tables of the third database after the third database has been instantiated;

wherein each database table of the plurality of database tables of the third database is populated with the data records copied from its corresponding database table of the plurality of database tables of the first database.

18. The method of claim 9 further comprising:

forming the second and third databases into a set of integrated databases by establishing data integrity for each of the one or more of data system access paths that link the second and the third databases;

wherein data integrity is established between the second and the third databases using at least some of the database tables from the first database as the only source of unique master reference data records for the corresponding database tables in both the second and third databases.

19. The method of claim 18 wherein any of the database tables of the first database that are not used as the only source of unique master reference data records for the corresponding database tables in both the second and third databases are removed from the first database.

* * * * *